(12) United States Patent
Roberts et al.

(10) Patent No.: US 9,590,728 B2
(45) Date of Patent: Mar. 7, 2017

(54) INTEGRATED PHOTOGRAMMETRIC LIGHT COMMUNICATIONS POSITIONING AND INERTIAL NAVIGATION SYSTEM POSITIONING

(71) Applicant: Intel Corporation, Santa Clara, CA (US)

(72) Inventors: Richard D. Roberts, Hillsboro, OR (US); Xue Yang, Arcadia, CA (US)

(73) Assignee: Intel Corporation, Santa Clara, CA (US)

( * ) Notice: Subject to any disclaimer, the term of this patent is extended or adjusted under 35 U.S.C. 154(b) by 779 days.

(21) Appl. No.: 13/631,909

(22) Filed: Sep. 29, 2012

(65) Prior Publication Data

US 2014/0093249 A1 Apr. 3, 2014

(51) Int. Cl.
| | |
|---|---|
| H04B 10/116 | (2013.01) |
| G01C 21/16 | (2006.01) |
| G01S 5/02 | (2010.01) |
| G01S 5/16 | (2006.01) |
| G01C 11/00 | (2006.01) |

(52) U.S. Cl.
CPC ............ *H04B 10/116* (2013.01); *G01C 11/00* (2013.01); *G01C 21/165* (2013.01); *G01S 5/0263* (2013.01); *G01S 5/16* (2013.01)

(58) Field of Classification Search
None
See application file for complete search history.

(56) References Cited

U.S. PATENT DOCUMENTS

| | | | |
|---|---|---|---|
| 4,422,099 A | 12/1983 | Wolfe | |
| 5,317,635 A | 5/1994 | Stirling et al. | |
| 5,394,259 A | 2/1995 | Takahara | |
| 5,531,642 A | 7/1996 | Shiomi et al. | |
| 5,577,733 A | 11/1996 | Downing | |
| 5,600,471 A | 2/1997 | Hirohashi et al. | |
| 5,903,373 A | 5/1999 | Welch et al. | |

(Continued)

FOREIGN PATENT DOCUMENTS

| | | |
|---|---|---|
| EP | 1436952 A1 | 7/2004 |
| EP | 2106041 A1 | 9/2009 |

(Continued)

OTHER PUBLICATIONS

Uchiyama, H., "Photogrammetric System using Visible Light", 2008, IEEE, pp. 1771-1776.*

(Continued)

*Primary Examiner* — Tung Lau
(74) *Attorney, Agent, or Firm* — Garrett IP, LLC

(57) ABSTRACT

A mobile device includes an inertial navigation system (INS) to measure inertial quantities associated with movement of the device, and estimate a kinematic state associated with the movement based on the measured inertial quantities. The device includes a light receiver to record light beams originating from lights at respective image positions in a sequence of images. The device photogrammetrically determines its position relative to the originating lights based on predetermined real-world positions and corresponding image positions of the lights. The device corrects the estimated kinematic state based on the photogrammetrically determined position, to produce a corrected estimated kinematic state.

21 Claims, 19 Drawing Sheets

(56) References Cited

U.S. PATENT DOCUMENTS

| | | | |
|---|---|---|---|
| 5,970,208 | A | 10/1999 | Shim |
| 6,400,482 | B1 | 6/2002 | Lupton et al. |
| 6,570,694 | B1 | 5/2003 | Yegnanarayanan |
| 6,594,050 | B2 | 7/2003 | Jannson et al. |
| 6,794,831 | B2 | 9/2004 | Leeb et al. |
| 6,819,878 | B1 | 11/2004 | King et al. |
| 6,941,076 | B1 | 9/2005 | Adams et al. |
| 6,954,591 | B2 | 10/2005 | Lupton et al. |
| 6,965,464 | B2 | 11/2005 | Mossberg |
| 7,149,256 | B2 | 12/2006 | Vrazel et al. |
| 7,352,972 | B2 | 4/2008 | Franklin |
| 7,415,212 | B2 | 8/2008 | Matsushita et al. |
| 7,689,130 | B2 | 3/2010 | Ashdown |
| 7,920,943 | B2 * | 4/2011 | Campbell et al. ............... 701/9 |
| 7,949,259 | B2 | 5/2011 | Suzuki |
| 8,070,325 | B2 | 12/2011 | Zampini et al. |
| 8,238,014 | B2 | 8/2012 | Kucharski et al. |
| 8,260,137 | B2 | 9/2012 | Linnartz |
| 8,334,901 | B1 | 12/2012 | Ganick et al. |
| 8,417,124 | B2 | 4/2013 | Ford |
| 8,488,971 | B2 | 7/2013 | Linnartz et al. |
| 8,494,367 | B2 | 7/2013 | Linnartz |
| 8,520,065 | B2 | 8/2013 | Staats et al. |
| 8,579,437 | B2 | 11/2013 | Su et al. |
| 8,588,616 | B2 | 11/2013 | Langer et al. |
| 8,588,621 | B2 | 11/2013 | Dahan et al. |
| 8,620,165 | B2 | 12/2013 | Kim et al. |
| 8,630,549 | B2 | 1/2014 | Kim et al. |
| 8,665,508 | B2 | 3/2014 | Kucharski et al. |
| 8,693,878 | B2 | 4/2014 | Schenk et al. |
| 8,729,835 | B2 | 5/2014 | Henig et al. |
| 8,737,842 | B2 | 5/2014 | Schenk et al. |
| 2001/0055136 | A1 | 12/2001 | Horiuchi et al. |
| 2002/0085094 | A1 | 7/2002 | Teuchert |
| 2002/0089722 | A1 | 7/2002 | Perkins et al. |
| 2002/0145776 | A1 | 10/2002 | Chow et al. |
| 2002/0167701 | A1 | 11/2002 | Hirata |
| 2003/0081287 | A1 | 5/2003 | Jannson et al. |
| 2004/0120025 | A1 | 6/2004 | LeHoty |
| 2004/0208616 | A1 | 10/2004 | Melendez et al. |
| 2005/0002673 | A1 | 1/2005 | Okano et al. |
| 2005/0036573 | A1 | 2/2005 | Zhang et al. |
| 2005/0047392 | A1 | 3/2005 | Ashwood Smith |
| 2005/0135527 | A1 | 6/2005 | Masui et al. |
| 2006/0204172 | A1 | 9/2006 | Shahar |
| 2006/0239689 | A1 | 10/2006 | Ashdown |
| 2006/0269287 | A1 | 11/2006 | Bidmead et al. |
| 2007/0177161 | A1 | 8/2007 | Ishii et al. |
| 2008/0049685 | A1 | 2/2008 | Becker et al. |
| 2008/0205900 | A1 | 8/2008 | Cole et al. |
| 2008/0298801 | A1 | 12/2008 | King et al. |
| 2009/0196615 | A1 | 8/2009 | Kauffman |
| 2009/0208221 | A1 | 8/2009 | Sasai |
| 2009/0228755 | A1 | 9/2009 | Franovici |
| 2009/0243815 | A1 | 10/2009 | Tolli |
| 2009/0247152 | A1 | 10/2009 | Manne |
| 2010/0060972 | A1 | 3/2010 | Kucharski et al. |
| 2010/0208236 | A1 * | 8/2010 | Damink et al. ............... 356/5.09 |
| 2010/0209119 | A1 | 8/2010 | Lee et al. |
| 2010/0250125 | A1 | 9/2010 | Lundberg et al. |
| 2010/0271476 | A1 | 10/2010 | Damink et al. |
| 2010/0290516 | A1 | 11/2010 | Lee et al. |
| 2010/0309958 | A1 | 12/2010 | Lakkis |
| 2010/0316380 | A1 | 12/2010 | de Lind Van Wijngaarden |
| 2011/0002695 | A1 | 1/2011 | Choi et al. |
| 2011/0069971 | A1 | 3/2011 | Kim et al. |
| 2011/0075581 | A1 | 3/2011 | Mihota |
| 2011/0096957 | A1 * | 4/2011 | Anai ............... G01C 11/10 382/106 |
| 2011/0144941 | A1 | 6/2011 | Roberts |
| 2011/0164881 | A1 | 7/2011 | Rajagopal et al. |
| 2011/0274429 | A1 | 11/2011 | Caplan et al. |
| 2012/0008961 | A1 | 1/2012 | Chen et al. |
| 2012/0033965 | A1 | 2/2012 | Zhang et al. |
| 2012/0076498 | A1 | 3/2012 | Sayeed et al. |
| 2012/0099868 | A1 | 4/2012 | Fischer et al. |
| 2012/0109356 | A1 | 5/2012 | Kong et al. |
| 2012/0162633 | A1 * | 6/2012 | Roberts et al. ............... 356/5.09 |
| 2012/0315036 | A1 | 12/2012 | Kucharski et al. |
| 2013/0028609 | A1 | 1/2013 | Staats et al. |
| 2013/0028612 | A1 | 1/2013 | Ryan et al. |
| 2013/0126713 | A1 | 5/2013 | Haas et al. |
| 2013/0170841 | A1 | 7/2013 | Liu et al. |
| 2013/0247117 | A1 | 9/2013 | Yamada et al. |
| 2013/0287403 | A1 | 10/2013 | Roberts |
| 2013/0301569 | A1 | 11/2013 | Wang et al. |
| 2014/0003817 | A1 | 1/2014 | Roberts et al. |
| 2014/0003823 | A1 | 1/2014 | Roberts et al. |
| 2014/0006907 | A1 | 1/2014 | Roberts et al. |
| 2014/0064739 | A1 | 3/2014 | Chen et al. |
| 2014/0086587 | A1 | 3/2014 | Roberts et al. |
| 2014/0086590 | A1 | 3/2014 | Ganick et al. |
| 2014/0093126 | A1 | 4/2014 | Roberts |
| 2014/0093234 | A1 | 4/2014 | Roberts et al. |
| 2014/0093238 | A1 | 4/2014 | Roberts |
| 2014/0153668 | A1 | 6/2014 | Xi et al. |
| 2014/0219663 | A1 | 8/2014 | Roberts |
| 2014/0308048 | A1 | 10/2014 | Roberts et al. |

FOREIGN PATENT DOCUMENTS

| | | |
|---|---|---|
| JP | 2010-014408 A | 1/2010 |
| JP | 2010-283616 A | 12/2010 |
| JP | 50-31427 B2 | 9/2012 |
| KR | 10-2006-0034883 A | 4/2006 |
| KR | 10-0761011 B1 | 9/2007 |
| KR | 10-2010-0083578 A | 7/2010 |
| KR | 10-2011-0083961 A | 7/2011 |
| KR | 10-1075747 B1 | 10/2011 |
| KR | 10-2012-0006306 A | 1/2012 |
| WO | 2008/113861 A2 | 9/2008 |
| WO | 2011/064342 A1 | 6/2011 |
| WO | 2012/037528 A2 | 3/2012 |
| WO | 2012/087944 A2 | 6/2012 |
| WO | 2013/048502 A1 | 4/2013 |
| WO | 2013/074065 A1 | 5/2013 |
| WO | 2013/081595 A1 | 6/2013 |
| WO | 2013/101027 A1 | 7/2013 |
| WO | 2013/165751 A1 | 11/2013 |
| WO | 2014/046757 A1 | 3/2014 |
| WO | 2014/051754 A1 | 4/2014 |
| WO | 2014/051767 A1 | 4/2014 |
| WO | 2014/051768 A1 | 4/2014 |
| WO | 2014/051783 A1 | 4/2014 |

OTHER PUBLICATIONS

Notice of Allowance received for U.S. Appl. No. 13/460,224, mailed on Apr. 16, 2014, 13 pages.

Non-Final Office Action received for U.S. Appl. No. 13/460,224, mailed on Oct. 11, 2013, 12 pages.

Notice of Allowance received for U.S. Appl. No. 13/539,354, mailed on Apr. 1, 2014, 5 pages.

Non-Final Office Action received for U.S. Appl. No. 13/539,354, mailed on Nov. 21, 2013, 6 pages.

International Preliminary Report on Patentability and Written Opinion received for PCT Patent Application No. PCT/US2011/054441, mailed on Apr. 10, 2014, 8 pages.

International Preliminary Report on Patentability and Written Opinion Received for PCT Patent Application No. PCT/US2011/060578, mailed on May 20, 2014, 5 pages.

International Search Report and Written Opinion received for PCT Patent Application No. PCT/US2013/037787, mailed on Aug. 12, 2013, 9 pages.

International Search Report and Written Opinion received for PCT Patent Application No. PCT/US2013/046224, mailed on Sep. 16, 2013, 3 Pages.

International Search Report and Written Opinion received for PCT Patent Application No. PCT/US2013/047343, mailed on Oct. 7, 2013, 11 pages.

(56) References Cited

OTHER PUBLICATIONS

International Search Report and Written Opinion received for PCT Patent Application No. PCT/US2013/047347, mailed on Aug. 27, 2013, 13 pages.
International Search Report and Written Opinion received for PCT Patent Application No. PCT/US2013/047350, mailed on Sep. 25, 2013, 11 pages.
International Search Report and Written Opinion received for PCT Patent Application No. PCT/US2013/047772, mailed on Sep. 27, 2013, 10 Pages.
International Search Report and Written Opinion received for Patent Application No. PCT/US2011/060578, mailed on Mar. 15, 2012, 10 pages.
International Search Report and Written Opinion received for Patent Application No. PCT/US2011/054441, mailed on Apr. 23, 2012, 11 pages.
Roberts, et al., "Methods and Arrangements for Frequency Shift Communications by Undersampling", PCT Patent Application No. PCT/US2011/060578, filed on Nov. 14, 2011, 33 Pages.
Roberts, Richard R., "Methods and Arrangements for Frequency Shift Communications", PCT Patent Application No. PCT/US2011/054441, filed on Sep. 30, 2011, 23 Pages.
Roberts, et al., "Methods and Arrangements for Error Correction in Decoding Data From an Electromagnetic Radiator", U.S. Appl. No. 13/539,354, filed Jun. 30, 2012, 45 Pages.
Roberts, et al., "Methods and Arrangements for Generating a Waveform for Frequency Shift Keying Communications", U.S. Appl. No. 13/539,351, filed Jun. 30, 2012, 47 Pages.
Daisuke, et al., "A Hybrid and Linear Registration Method Utilizing Inclination Constraint", ISMAR '05 Proceedings of the 4th IEEE/ACM International Symposium on Mixed and Augmented Reality, pp. 140-149.
Yoshino, et al., "High-accuracy Positioning System using Visible LED Lights and Image Sensor", 1-4244-1463-6/08 RWS 2008 IEEE, pp. 439-442.
Tanaka, et al., "New Position Detection Method using Image Sensor and Visible Light LEDs", IEEE Second International Conference on Machine Vision, Dec. 28-30, 2009, pp. 150-153.
Horikawa, et al., "Pervasive Visible Light Positioning System using White LED Lighting", vol. 103; No. 721(CS2003 178-197), 2004, pp. 93-99.
Wikipedia, "Rotation matrix", From Wikipedia, the free encyclopedia; Available at: http://en.wikipedia.org/wiki/Rotation_matrix, pp. 1-22.
Roberts, et al., "Methods and Apparatus for Multiphase Sampling of Modulated Light", U.S. Appl. No. 13/630,066, filed Sep. 28, 2012, 71 Pages.
Roberts, Richard R., "Location Detection System", PCT Patent Application No. PCT/US2011/62578, filed on Nov. 30, 2011, 51 Pages.
Gopalakrishnan, et al., "Location Based Technology for Smart Shopping Services", PCT Patent Application No. PCT/US2011/067749, filed on Dec. 29, 2011, 18 Pages.
Extended European Search Report received for European Patent Application No. 11873073.8, mailed on Apr. 8, 2015, 11 pages.
Notice of Allowance received for U.S. Appl. No. 13/538,888, mailed on Jun. 17, 2014, 11 pages.
Non-Final Office action received for U.S. Appl. No. 13/539,351, mailed on Feb. 24, 2015, 8 pages.
Notice of Allowance received for U.S. Appl. No. 13/539,354, mailed on Apr. 30, 2015, 7 pages.
Notice of Allowance received for U.S. Appl. No. 13/539,354, mailed on Dec. 22, 2014, 7 pages.
Notice of Allowance received for U.S. Appl. No. 13/539,354, mailed on Aug. 29, 2014, 7 pages.
Notice of Allowance received for U.S. Appl. No. 13/625,361, mailed on Dec. 17, 2014, 10 pages.
Non-Final Office Action received for U.S. Appl. No. 13/625,361, mailed on Jul. 31, 2014, 11 pages.
Non-Final Office Action received for U.S. Appl. No. 13/629,843, mailed on Nov. 7, 2014, 19 pages.
Notice of Allowance received for U.S. Appl. No. 13/629,843, mailed on Jun. 16, 2015, 9 pages.
Non-Final Office action received for U.S. Appl. No. 13/977,695, mailed on Apr. 7, 2015, 16 pages.
Notice of Allowance received for U.S. Appl. No. 13/977,696, mailed on Jun. 22, 2015, 8 pages.
IEEE, "Part 15.7: PHY and MAC standard for shortrange wireless optical communication using visible light", IEEE Wireless MAC and PHY Specifications for Vpans, Std 802.15.7 Draft, XP017637045, Nov. 14, 2010, pp. 1-296.
International Preliminary Report on Patentability and Written Opinion Received for PCT Patent Application No. PCT/US2013/037787, mailed on Nov. 13, 2014, 6 pages.
International Preliminary Report on Patentability and Written Opinion Received for PCT Patent Application No. PCT/US2013/046224, mailed on Apr. 9, 2015, 8 pages.
International Preliminary Report on Patentability and Written Opinion Received for PCT Patent Application No. PCT/US2013/047343, mailed on Apr. 9, 2015, 8 pages.
International Preliminary Report on Patentability and Written Opinion Received for PCT Patent Application No. PCT/US2013/047347, mailed on Apr. 9, 2015, 10 pages.
International Preliminary Report on Patentability and Written Opinion Received for PCT Patent Application No. PCT/US2013/047350, mailed on Apr. 2, 2015, 8 pages.
International Preliminary Report on Patentability and Written Opinion Received for PCT Patent Application No. PCT/US2013/047772, mailed on Apr. 9, 2015, 7 pages.
Sha'Ameri, et al., "Detection of Binary Data for FSK Digital Modulation Signals Using Spectrum Estimation Techniques", IEEE, Telecommunication Technology, NCTT Proceedings, 4th National Conference, XP010636785, ISBN: 978-0-7803-7773-8, Jan. 14, 2013, pp. 155-158.
Yamazato, et al., "Experimental Results on Simple Distributed Cooperative Transmission Scheme with Visible Light Communication", IEICE Trans. Commun., vol. E93-B, No. II, XP-001559468, Nov. 1, 2010, pp. 2959-2962.

\* cited by examiner

900

905 — In a light receiver, sampling and recording spatially-separated, modulated (anchor) light beams originating from modulated (anchor) lights of a light array, to produce a sequence of images of the light array, each of the light beams modulated to indicate a unique light identifier (ID) of the respective originating light 910 — Determining positions in the images where the light beams are recorded, and demodulating, at the determined positions, the light (IDs) from the recorded modulated light beams 915 — Accessing real-world positions of the lights as deployed in the light array based on the demodulated light IDs 930 — Photogrammetrically determining a position of the light receiver relative to the light array based on the accessed real-world positions and the corresponding/matching determined image positions of the lights

- 1645: Determining an error in the estimated kinematic state based on the photogrammetrically determined position
- 1650: Filtering the determined error over time, to produce a correction
- 1655: Adjusting the kinematic state estimate based on the correction

- 1675: Transforming the estimated kinematic state from a navigation coordinate frame to an image plane coordinate frame of the light imager
- 1680: Predicting where each beam position will move across the light imager based on the transformed estimated kinematic state
- 1685: Demodulating the ID from each recorded light beam ID from the corresponding image position in the light imager, taking into account the predicted movement of the beam
- 1690: Access the predetermined real-world position of each originating light based on the demodulated ID

FIG. 16C

INTEGRATED PHOTOGRAMMETRIC LIGHT COMMUNICATIONS POSITIONING AND INERTIAL NAVIGATION SYSTEM POSITIONING

BACKGROUND

An Inertial Navigation System (INS) for a mobile device includes inertial sensors, such as an accelerometer, a gyroscope, and a magnetometer, integrated into the device. The accelerometer and gyroscope measure an acceleration and a rate of rotation of the device, respectively, from which the INS derives or estimates a navigation solution, including position and velocity, based on Newton's Laws. The magnetometer measures the Earth's magnetic field to provide a reference orientation.

Ideally, the INS is a self-contained navigation system that does not depend on an external reference. In practice, however, the INS may rely on low cost inertial sensors configured as Micro Electro-Mechanical Systems (MEMS). MEMS inertial sensors have inherently high rates of measurement error drift and a high level of measurement noise. As a result, errors in the INS navigation solution, such as errors in the estimated position and the velocity, grow relatively quickly over time.

Photogrammetric positioning requires that an observer observe multiple visual features, such as lights, having known positions. The observer may be a camera equipped smartphone, for example. A position of the observer relative to the observed lights can be determined using photogrammetric equations, based on the known positions of the observed lights. Such photogrammetric positioning can provide a relatively accurate position estimate if a sufficient number of visual features can be observed. Frequently, however, movement of the observer and/or line-of-sight blockages between the observer and the lights can interrupt photogrammetric positioning.

Accordingly, especially for a moving observer, photogrammetric positioning tends to provide infrequent yet relatively accurate position estimates with relatively stable errors over time, while INS-derived positioning tends to provide frequent and continuous position and velocity estimates with relatively unstable and diverging errors over time.

BRIEF DESCRIPTION OF THE DRAWINGS/FIGURES

FIG. 9 is a flowchart of an example method summarizing photogrammetric position determination of a light receiver relative to a light transmitter.

FIG. 16B is a flowchart expanding on correcting performed in the method of FIG. 16A.

FIG. 16C is a flowchart of an example method of determining real-world positions of lights, according to the tightly coupled embodiment.

DETAILED DESCRIPTION

Described below are embodiments directed to integrated photogrammetric light communications positioning (PG-LCP) and Inertial Navigation System (INS) positioning. The integrated PG-LCP and INS positioning embodiments are described most specifically in connection with FIGS. 10-16, and 19. Integrated PG-LCP and INS positioning provides improved position determination of a mobile device. Benefits of the integrated PG-LCP and INS positioning system include a reduced dependence on physical infrastructure such as light fixtures in buildings, and a higher tolerance to impaired line-of-sight conditions.

In embodiments of PG-LCP and INS positioning, a mobile device includes an inertial navigation system (INS) to measure inertial quantities associated with movement of the device, and estimate a kinematic state associated with the movement based on the measured inertial quantities. The estimated kinematic state may be represented as a vector including an estimated position, an estimated velocity, and an estimated orientation. The device also includes a light receiver to record light beams originating from lights at respective image positions in a sequence of images. The device photogrammetrically determines its position relative to the originating lights based on predetermined real-world positions and corresponding image positions of the lights. The device corrects the estimated kinematic state based on the photogrammetrically determined position, to produce a corrected estimated kinematic state.

Figure 1A:
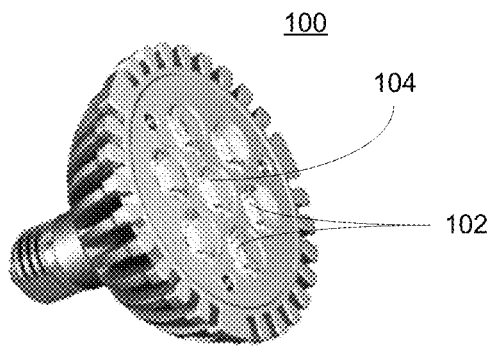
FIG. 1A is an illustration of an example light array, which may operate in accordance with embodiments described herein.

The ensuing description is divided into the following sections:
  Light Arrays
  Light Beam Diagram
  Light Communication System Using FSOOK
    Light Transmitter
    Light Receiver
  Multi-light Transmitter
  Photogrammetric Position Determination
    Method Flowchart
  Integrated Photogrammetric Light Communications Positioning (PG-LCP) and INS Positioning
    INS
    PG-LCP
    Integrated PG-LCP and INS Positioning Embodiments
      Loosely Coupled Embodiment
      Tightly Coupled Embodiment
    Method Flowcharts
  Computer Processor System
  Wireless Communication Receiver System
  General Treatment of Photogrammetric Positioning
  Computer Program, Apparatus, and Method Embodiments Light Arrays FIG. 1A is an illustration of an example light array 100, which may operate according to embodiments described herein. Light array 100 includes LEDs 102 that are spatially-separated from each other in 2-dimensions, but clustered closely together around a center LED 104.

Figure 1B:
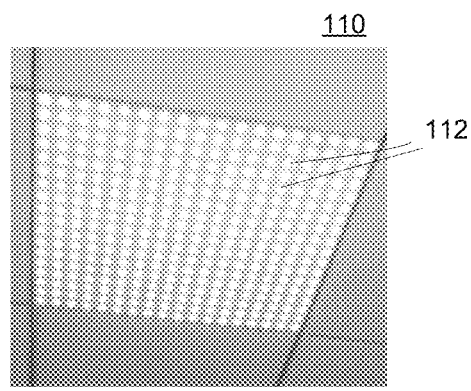
FIG. 1B is an illustration of another example light array, which may operate in accordance with the embodiments described herein.

FIG. 1B is an illustration of an example light array 110, which may operate according to embodiments described herein. Array 110 includes a rectangular array of LEDs 112 that are spatially-separated so as to be relatively far apart from each other compared to lights 102 of array 100.

Figure 1C:
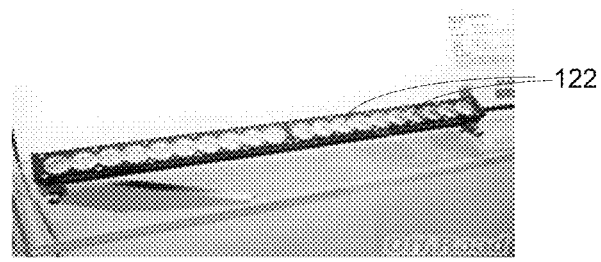
FIG. 1C is an illustration of yet another example light array, which may operate in accordance with the embodiments described herein.

FIG. 1C is an illustration of an example light array 120, which may operate according to embodiments described herein. Array 110 includes a linear array, or line bar, of LEDs 122.

Light Beam Diagram

Figure 2:
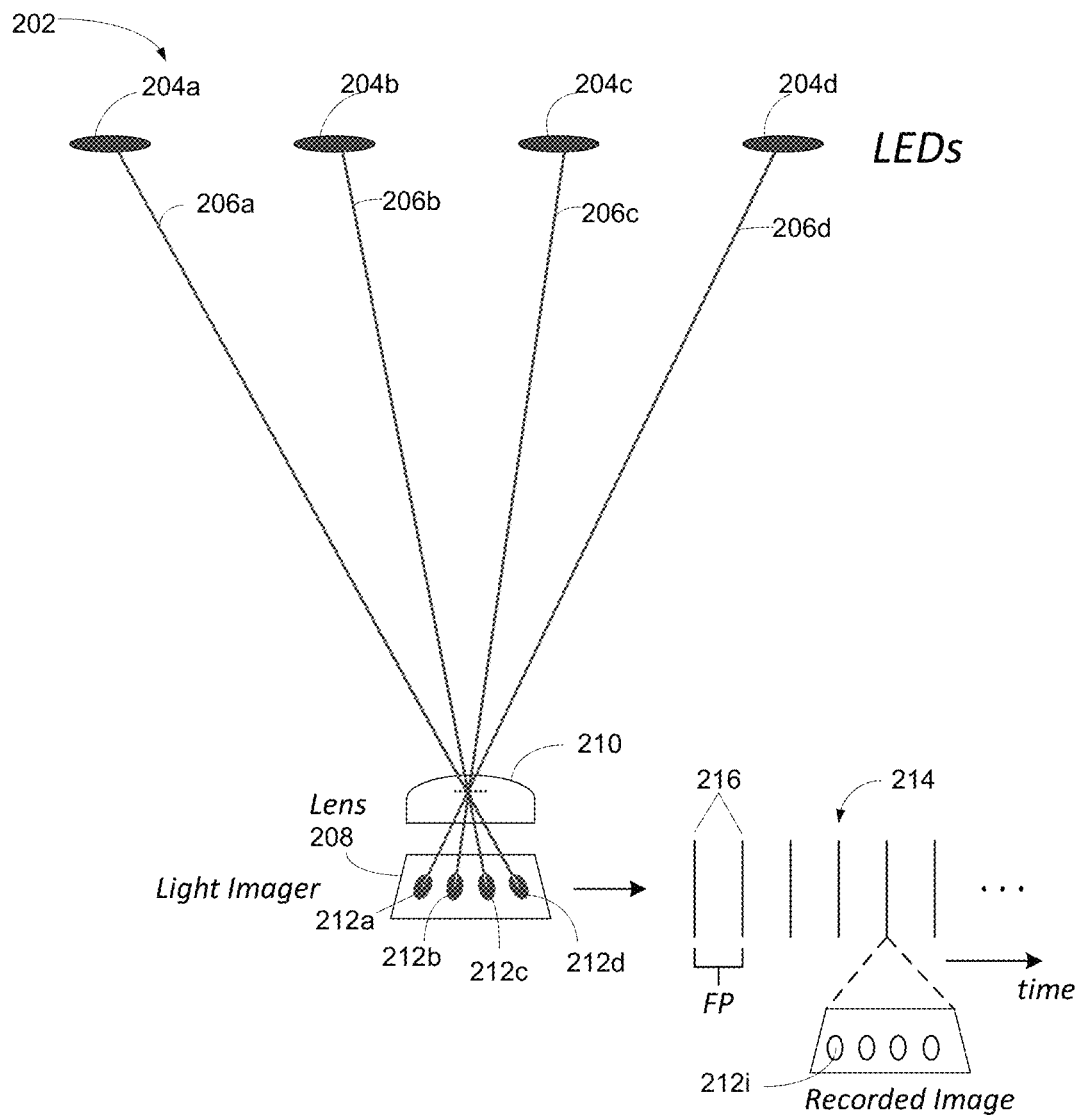
FIG. 2 is a diagram of an example light communication system employing spatially-separated beams.

FIG. 2 is a diagram of an example light array 202 that may operate in accordance with embodiments described herein. FIG. 2 introduces concepts helpful to understanding the embodiments described later. Light array 202 may be configured similarly to any of light arrays 100, 110, and 120, or any other light array including spatially-separated lights. Array 202 includes lights 204a-204d implemented to transmit simultaneously a respective one of free-space optical light beams 206a-206d to a multi-dimensional or planar light imager/sensor 208, through an imaging lens 210. The terms "light beam" and "light" are use equivalently and interchangeably throughout the ensuing description.

Light imager 208 may include a multi-dimensional charge coupled device (CCD) array including many sensor pixels or light detectors, as is known in the art. Light beams 206a-206d are sufficiently spatially-separated from one another as to form corresponding beam images 212a-212d, or light spots, on spatially-separated areas of light imager 208. Each of light spots/areas 212i occupies a position, e.g., an x-y position on a light sensor plane of the light imager, corresponding to a cluster of sensor pixels. Over time, light imager 208 repetitively captures or records, simultaneous light beams 206i impinging on areas 212i, to produce a time-ordered sequence 214 of recorded images 216 of light array 202.

Light imager 208 captures the images at a predetermined frame rate of, e.g., approximately 30 frames/second, i.e., every 1/30 seconds. Therefore, sequential images 216 are spaced in time by a frame period equal to an inverse of the frame rate. Sequential images 216 may be processed in accordance with methods described herein.

Light Communication System Using FSOOK

Figure 3A:
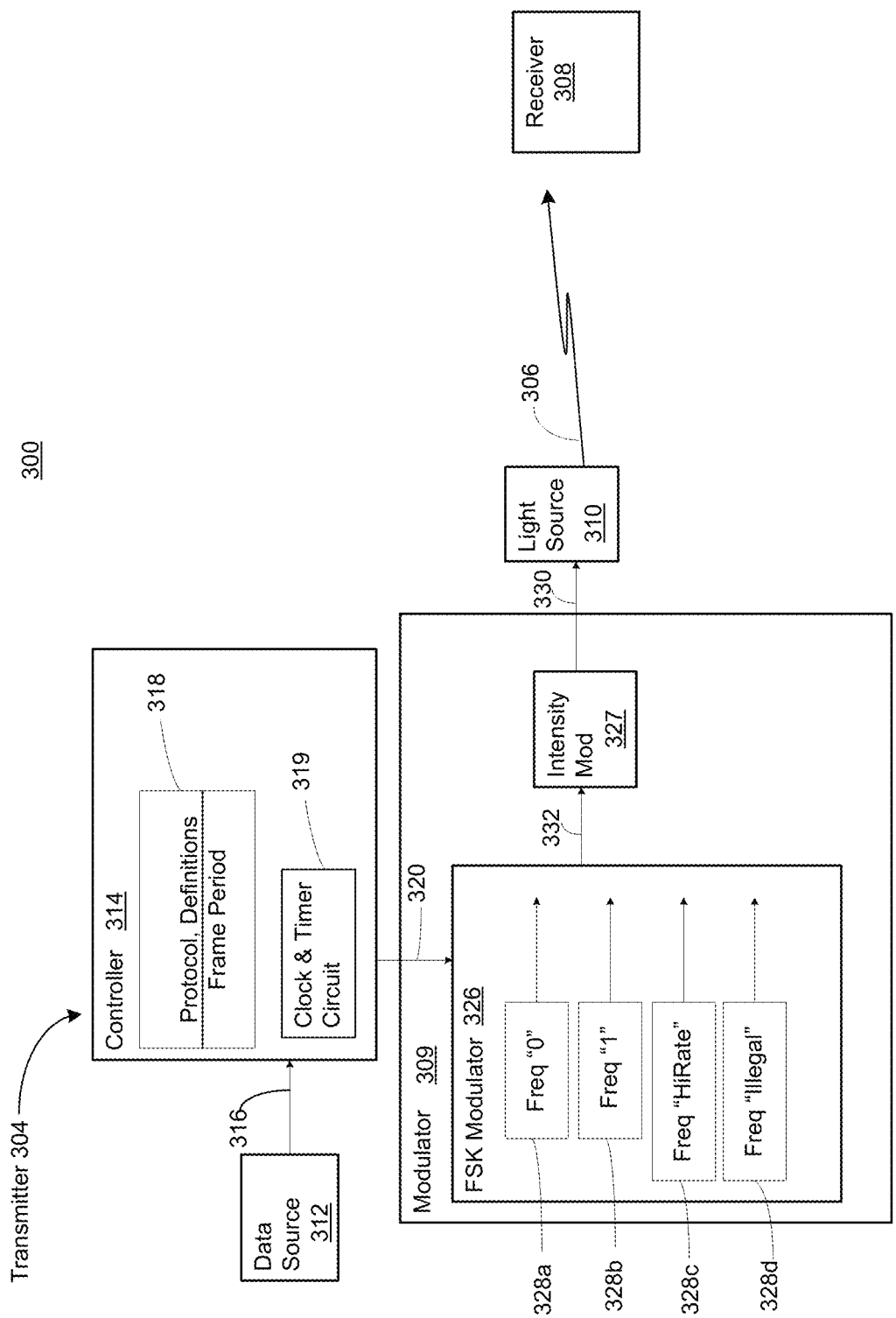
FIG. 3A is a block diagram of an example light communication system and an example light transmitter useful to introduce the principles of frequency shift on-off keying (FSOOK) modulation and detection/demodulation, as it applies to the embodiments described herein.

FIG. 3A is a block diagram of an example light communication system 300 useful to introduce the principles of FSOOK modulation and detection/demodulation. System 300 includes a light transmitter 304 to transmit a FSOOK modulated light beam 306 comprising modulated light packets to a light receiver 308, which detects and demodulates the received light. The FSOOK modulated light beam conveys modulated light packets formatted according to protocol light packet definitions.

Light Transmitter

Light transmitter 304 includes a light modulator 309 to intensity modulate a light source 310, a data source 312, and a controller 314 to control the transmitter. Data source 312 provides data 316, such as a message in the form of data bits, to controller 314. Controller 314 includes a memory 318 to store protocol control logic, protocol light packet definitions, and a frame rate $F_{fps}$ in frames per second, which is equal to the inverse of a frame period $T_{frame}$ in seconds (i.e., $F_{fps}=1/T_{frame}$). The frame rate $F_{fps}$ is an anticipated rate at which light receiver 308 will sample received light, as will be described more fully below in connection with FIG. 3B.

Controller 314 also includes a clock and timer module 319 to generate a master timing signal, and derive from the master timing signal timing outputs used by controller 314 to control transmit light packet start times and durations based on the master timing signal. Based on data 316, the contents of memory 318, and the timing outputs from clock and timer module 319, controller 314 generates commands 320 to cause modulator 309 to modulate light source 310 in accordance with examples described herein.

Modulator 309 includes an FSK modulator 326 and an intensity modulator 327 that together generate a modulation signal 330 to FSOOK modulate light source 310. Controller commands 320 include commands that specify (i) a selected frequency at which FSK modulator is to operate, (ii) a start time at which FSK modulator 326 is to begin generating and outputting the selected frequency, and (iii) a duration (or time period) over which the selected frequency is to be generated. The start time and duration may be graduated in fractions of time period $T_{frame}$, such as 1/1000 of $T_{frame}$. In response to controller commands 320, FSK modulator 326 outputs the selected frequency as an FSK signal 332 beginning at the specified time and duration, such as for an integer number of frame periods, which facilitates detection and demodulation of the frequency at receiver 308. The selected frequencies may include:

a first frequency 328a F0 (e.g., 120 Hz) indicative of a logic 0 of a data bit 316 to be transmitted;

a second frequency 328b F1 (e.g., 105 Hz) indicative of a logic 1 of the data bit to be transmitted;

a third frequency 328c "HiRate" indicative of a first start-frame-delimiter to be transmitted. The HiRate frequency is orders of magnitude greater than frequencies F0, F1, e.g., many KHz or above. An exemplary HiRate frequency is 25 KHz; and a fourth frequency 328d "Illegal" (e.g., 112.5 Hz, i.e., half-way between frequencies F0, F1) indicative of a second start frame delimiter to be transmitted.

FSK modulator 326 may include a voltage, or digitally, controlled oscillator that generates the above frequency responsive to commands 320. The terms "tone" or "tones" and "frequency" or "frequencies" are used equivalently and interchangeably herein.

Figure 4A:
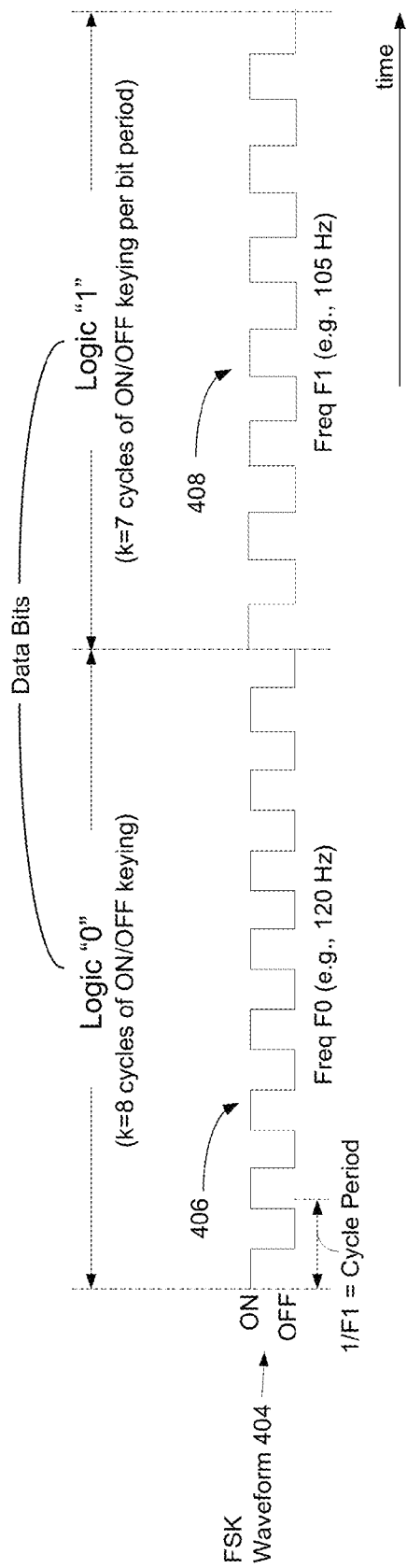
FIG. 4A is an illustration of an example timing diagram of a frequency shift keying (FSK) waveform corresponding to an FSK signal from FIG. 3A.

FSK modulator 326 may generate each of the frequencies F0, F1, HiRate, and Illegal of FSK signal 332 as a substantially rectangular, or ON-OFF keying, waveform, where ON represents a logic 1 of the FSK waveform, and OFF represents a logic 0 of the FSK waveform. Also, to transmit a data bit, each of frequencies F0 and F1 may extend over multiple frame periods, and may be harmonically related to the frame period such that an integer number, k, of ½ cycles or periods of the rectangular FSK waveform matches the frame period, as is depicted in FIG. 4A (described below). More generally:

representing a logic 0, frequency $F0=N \times F_{fps}$; and representing a logic 1, frequency $F1=N \pm 0.5 F_{fps}$, where N is an integer.

Each of the frequencies F0, F1, HiRate, and Illegal, together with the respective number of frames over which they are transmitted, form a light protocol. More specifically, transmitter 304 combines these parameters into the above mentioned modulated light packets formatted in accordance with the light protocol, and then transmits the light packets.

FIG. 4A is an illustration of an example timing diagram of an FSK waveform 404 corresponding to FSK signal 332 in FIG. 3A, where the frame rate $F_{fps}$ is 30 Hz, the bit rate is half the frame rate, i.e., the bit rate is ½ $F_{fps}$=15 bits-per-second, and N=4. Therefore, each data bit has a duration that is two frames periods, i.e., $2 \times T_{frame}$. Therefore, to transmit two consecutive data bits, e.g., a logic 0 followed by a logic 1, controller commands 320 cause FSK modulator 326 to generate first an ON-OFF keying waveform 406 at frequency F0 (e.g., 120 Hz=4×30 Hz) for a time period of two frames to represent the logic 0 data bit, and then an ON-OFF keying waveform 408 at frequency F1 (e.g., 105 Hz=3.5×30 Hz) for a period of two frames to represent the logic 1 data bit. The harmonic relationship between frequencies F0 and F1 and the period of two frames is such that (i) waveform 406 at frequency F0 includes eight full cycles, i.e., k=8, during the data bit period, and (ii) waveform 408 at frequency F1 includes seven full cycles or periods, i.e., k=7, during the second data bit period. In other words, over a bit period, eight cycles of FSK signal 332 represent a logic 0, while seven cycles represent a logic 1.

Intensity modulator 327 intensity modulates light source 310 based on the modulation signal 330, to produce modulated light beam 306. Light source 310 may be an LED that emits light in any of the visible, infrared, or ultraviolet light spectrums. In an embodiment, modulation signal 330 follows the shape of FSK signal 332 and adjusts a current through light source 310 to proportionally adjust an intensity of light 306 emitted by the light source. In this manner, ON-OFF keying of modulation signal 330 causes corresponding ON-OFF keying of the intensity of light 306, such that the intensity closely follows ON-OFF keying waveforms 404, 406 depicted in FIG. 4A. Other intensity modulation embodiments are possible, e.g., light source 310 may not be turned off completely during the OFF cycle of the FSK waveform, and so on. For example, a reduced light intensity (e.g., ½ of maximum intensity) from light source 310 may serve as an alternative for the HiRate frequency. Applying a reduced steady state drive current to the light source 310 will cause the light intensity emitted by the light to be correspondingly reduced. Because other such intensity levels are possible, e.g., light source 310 may not be turned off completely, the intensity levels ON, OFF are more generally represented as intensity levels HIGH, LOW.

Transmitter 304 is depicted with one light 310 for simplicity only. Other embodiments include many lights each driven by a corresponding light modulator, as will be described later in connection with FIG. 6.

Transmit Light Packet Definition

Figure 4B:
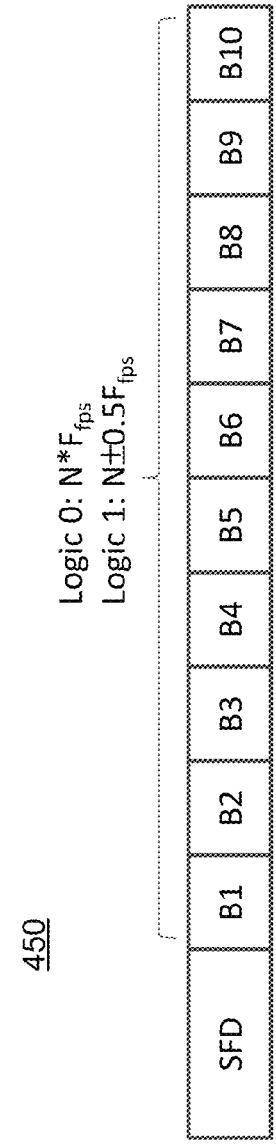
FIG. 4B is an illustration of an exemplary light packet definition or light packet protocol for light packets formatted and transmitted by the light transmitter of FIG. 3A.

FIG. 4B is an illustration of an exemplary light packet definition 450 or light packet protocol for light packets formatted and transmitted by light transmitter 304. According to light packet definition 450, each light packet includes sequential fields of light, beginning with the SFD, which includes light that is intensity modulated at one of the HiRate and Illegal frequencies for multiple, e.g., four, frame periods. Following the SFD, the light packet conveys a series of consecutive, contiguous message bits B1-B10, each of which may be either a logic 0 or a logic 1. Message bits B1-B10 are each conveyed as light that is intensity modulated at the corresponding FSK frequency F0 (for logic 0) or F1 (for logic 1) for two frame periods, i.e., light that is cyclically keyed to multiple intensity levels (e.g., ON, OFF, or HIGH, LOW) at the FSK frequency indicative of the appropriate bit level (i.e., logic 0 or logic 1).

Light Receiver

Figure 3B:
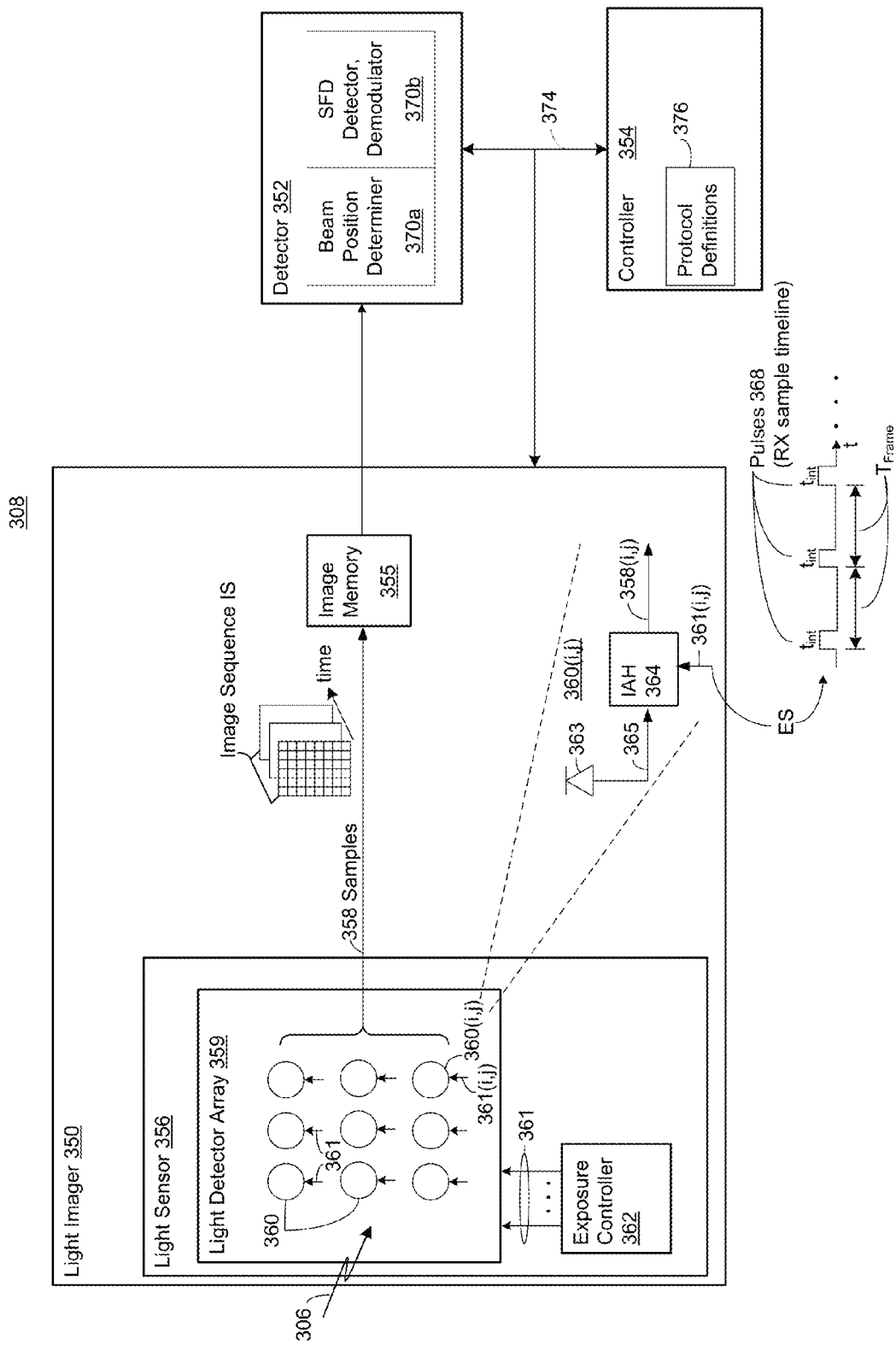
FIG. 3B is a block diagram of a light receiver from FIG. 3A, according to an embodiment.

FIG. 3B is a block diagram of light receiver 308, according to an embodiment. Light receiver 308 receives the modulated light packets conveyed in modulated light beam 306. In embodiments, light receiver 308 will receive many spatially-separated modulated light beams simultaneously. Light receiver 308 includes a light imager 350 (also referred to as an imager 350) to sample and record received modulated light packets in light beam 306 as images, a detector 352 to detect and demodulate the fields of modulated light in the light packets recorded in the images, and a controller 354 to control the receiver and process the recorded images as described in one or more examples herein.

Imager 350 includes a light sensor 356, e.g., including a 2-dimensional array of light detectors, that repetitively samples light impinging on the light sensor at a predetermined receive sample rate equal to the frame rate, $F_{fps}=1/T_{frame}$, of imager 350 to produce a signal 358. Signal 358 includes a time-ordered sequence of 1-dimensional, or alternatively, 2-dimensional light samples, which form images of an image sequence IS (similar to images 216 depicted in FIG. 2). In other words, the images are formed from the light samples. Accordingly, signal 358 is referred to in terms of both "light samples 358" and "images 358" interchangeable and equivalently. Imager 350 records images 358 in an image memory 355 of the imager.

Light Detector Array

Light sensor 356 may include a 2-dimensional light detector array 359, such as a CCD array, including multiple individual light detectors 360 (also referred to as sensor pixels 360) spatially arranged in M rows by N columns, where M and N may each be in the hundreds or thousands. For convenience, exemplary light detector array 359 is depicted in FIG. 3B as having only 3 rows by 3 columns of light detectors 360. Each of light detectors 360 receives a corresponding one of multiple enable signals 361 generated by an exposure controller 362 of light sensor 356. Enable signals 361 cause light detectors 360 to sample light in a controlled manner, to produce light samples 358 (forming the images), which may be digitized light samples, as will be described more fully below.

An exemplary individual light detector 360($i$, $j$) is depicted in expanded view in FIG. 3B at the bottom right-hand side of the imager block 350. Descriptors ($i$, $j$) indicate the row ($i$) and column ($j$) positions in array 359, where $i$=1 ... M, $j$=1 ... N. Light detector 360($i$, $j$) includes a photo-detector 363 followed by an integrate-and-hold (IAH) circuit 364. Photo-detector 363 converts light energy 306 impinging thereon into an electrical signal 365 having a magnitude that follows or represents the intensity of the light energy.

IAH circuit 364 operates as an approximated matched filter to recover samples of the FSK light waveform pulses, such as the pulses of waveforms 406, 408, in the light packets of light beam 306. IAH circuit 364 integrates electrical signal 365 for an integration time $t_{int}$ according to enable signal 361($i$, $j$), to produce a peak integrated signal, also referred to herein as light sample 358($i$, $j$) or sampled light 358($i$, $j$), which is held at the output of the IAH circuit. The process of enabling light detector 360($i$, $j$) to sample light 306 in accordance with enable signal 361($i$, $j$), to produce light sample 358($i$, $j$), is also referred to herein as "exposing light detector 360($i$, $j$), to produce light sample 358($i$, $j$)." Integration time $t_{int}$ may be approximately a half-period or less of the waveforms of frequencies F0, F1, so that light detector 360($ii$, $j$) approximately maximally samples light that is intensity modulated at frequencies F0, F1 of FSK waveforms 406, 408 (for logic levels 0, 1).

An exemplary enable signal waveform "ES" of enable signal 361($i$, $j$) is depicted at the bottom of FIG. 3B. Enable signal 361($i$, $j$) (e.g., waveform ES) may include a series of enable pulses 368 spaced in time from each other by frame period $T_{frame}$, i.e., the enable pulses have a pulse repetition rate equal to the frame rate $F_{fps}=1/T_{frame}$ of image sensor 356. Each of enable pulses 368 has a pulse width equal to $t_{int}$ to enable IAH circuit 364 to integrate energy over the pulse width, and hold peak integrated signal 358($i$, $j$) at the output until a next pulse in the series of pulses causes the IAH to resample its input. Enable pulses 368 establish and represent a receive sample timeline of light receiver 308. In this way, light detector 360($i$, $j$) samples light energy 306 impinging on position ($i$, $j$) of light detector array 359 at frame rate $F_{fps}$, to produce sampled light energy as a series of light samples represented at 358($i$, $j$) coinciding with pulses 368. Each of light detectors 360 may simultaneously sample light energy 306, to produce simultaneous light samples 358(1-M, 1-N) represented in signal 358.

Global and Line Array Exposure Modes

Exposure controller 362 generates enable signals 361 in any number of ways to implement different exposure modes of light detector array 359, as is now described.

Exposure controller 362 may expose array 359 (i.e., enable light detectors 360 to sample light 306 in accordance with enable signals 361, to produce light samples 358) in either a global exposure mode or, alternatively, in a sequential line exposure mode. In the global exposure mode, exposure controller 362 generates enable signals 361 so that their respective series of enable pulses 368, i.e., respective integration periods $t_{int}$, coincide in time with each other, i.e., occur at the same time. The result is that all of light detectors 360 are exposed at the same time, i.e., they all sample light 306 at the same time, once every frame period $T_{frame}$, to produce a time-spaced sequence of 2-D images represented in images 358 (which represents all light samples 358($i$, $j$), $i$=1 ... M, $j$=1 ... N), as represented in FIG. 3B by image sequence IS. Each image in the sequence of images IS includes a 2-D array of light samples corresponding to the 2-D array of light detectors 360.

In the line exposure mode, exposure controller 362 may generate enable signals 361 to expose spatially-successive lines, e.g., successive rows or successive columns, of light detectors 360 one after the other, e.g., one at a time, in a time sequence. For example, exposure controller 361 may generate enables signals 361 so as to expose:

all of light detectors 360 across row $i-1$ (i.e., all of the N light detectors 360($i-1$, 1-N)) at a same time $t-\tau$; then all of light detectors 360 across row $i$ at a same time $t$; then all of light detectors 360 across row $i+1$ at a same time $t+\tau$, and so on.

This produces spatially-successive lines of sampled light, spaced in time at sequential times $t-\tau$, $t$, $t+\tau$, corresponding to light detector rows $i-1$, $i$, $i+1$, and so on. This type of exposure is also referred to as "rolling shutter exposure" because the exposure may be thought of as being implemented using a camera shutter one line of light detectors wide (i.e., that is only wide enough to expose one line of light detectors at a time), that "rolls" or scans sequentially across spatially-successive lines (e.g., the rows or columns) of light detectors in a given direction (e.g., up/down, left/right), to thereby sequentially expose the spatially-successive lines of light detectors. In an embodiment, exposure controller 362 sequentially exposes the spatially-successive lines of light detectors at a rate (referred to as a "line exposure rate") that is greater than both frequencies F0, F1 of the FSK waveforms representing logic levels 0, 1 in transmitted light packets. The line exposure rate is equal to $1/\tau$.

In a variation of the above-described line exposure mode, the enable signals 361 may be generated to be slightly offset in time but overlapping, so that the exposure of each line time-overlaps the exposure of the spatially-successive line. For example, row $i-1$ begins its exposure at a time $t_{i-1}$, and while being exposed (e.g., before time $t_{int}$ expires for row $i-1$), row $i$ begins its exposure, and while being exposed (e.g., before time $t_{int}$ expires for row $i$), row $i+1$ begins its exposure, and so on. This variation of the line exposure mode results in time spaced lines of sampled light corresponding to light detector rows $i-1$, $i$, $i+1$, but with overlapping exposure times for successive rows.

Figure 3C:
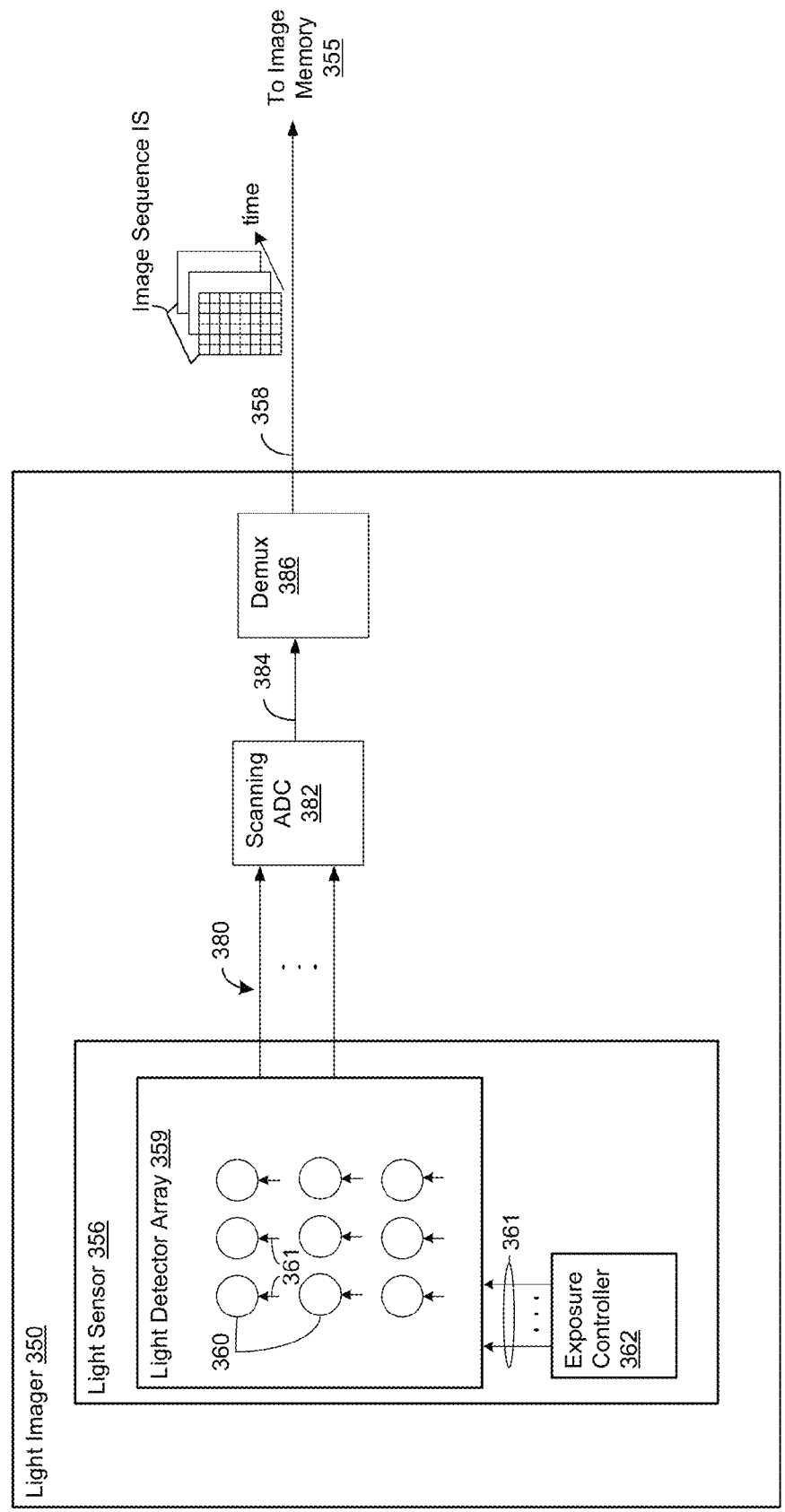
FIG. 3C is a block diagram of a light imager including light sample digitizing modules, according to an embodiment.

FIG. 3C is a block diagram of light imager 350 including light sample digitizing modules, according to an embodiment. Light detectors 360 provide corresponding sampled outputs 380 to a light detector (or pixel) scanning analog-to-digital converter (ADC) 382 that sequentially scans across each of the light detectors and digitizes its corresponding sampled output, to produce sequential, digitized sampled outputs 384. A demultiplexer 386 converts the sequential, digitized sampled outputs into an array of digitized, sampled outputs representative of images 358. Use of scanning ADC 382 and demultiplexer 386 reduces the number of ADCs that might otherwise be required to digitize all of the sampled outputs 380 in parallel.

Detector

Detector 352 includes a beam position determiner module 370a, and a SFD detector/demodulator module 370b (collectively referred to as "modules 370" and "modules 370a, 370b"), which cooperate to process the sequence of images stored in memory 355, namely to:

determine a position of each beam recorded in the images, such as an x, y center coordinate of the beam in each image (using beam position determiner 370a); and from the modulated light recorded at the determined beam positions, both detect any delimiters (SFDs) and demodulate any data bits conveyed by that recorded light (using detector/demodulator 370b).

As described above, light detectors 360 sample FSK waveform pulses in light 306, such as the pulses of waveforms 406, 408 at frequencies F0, F1 (representing logic levels 0, 1), and provide the resulting samples 358 to modules 370a, 370b, e.g., in a sequence of 1-dimensional or 2-dimensional images IS.

To detect a beam position, beam position determiner 370a raster scans the full area of each image in the sequence of images (e.g., in image sequence IS) stored in memory 355, e.g., first, second, third, and fourth sequential images, and so on, in search of recorded light energy that has a correlated position across the sequence of images. In other words, a beam position is determined when beam position determiner 370a detects a spot of modulated light, i.e., modulated light energy, centered on the same position, e.g., an x, y position corresponding to a row, column position, in each of the sequential images. Beam positions for multiple, spatially-separated, simultaneously recorded beams may be determined in this manner.

From each determined position, SFD detector/demodulator 370b associates corresponding light samples 358, over multiple recorded images, to one of: a demodulated data bit level, i.e., logic 0 or logic 1; a demodulated data delimiter; and a detected SFD.

Figure 5:
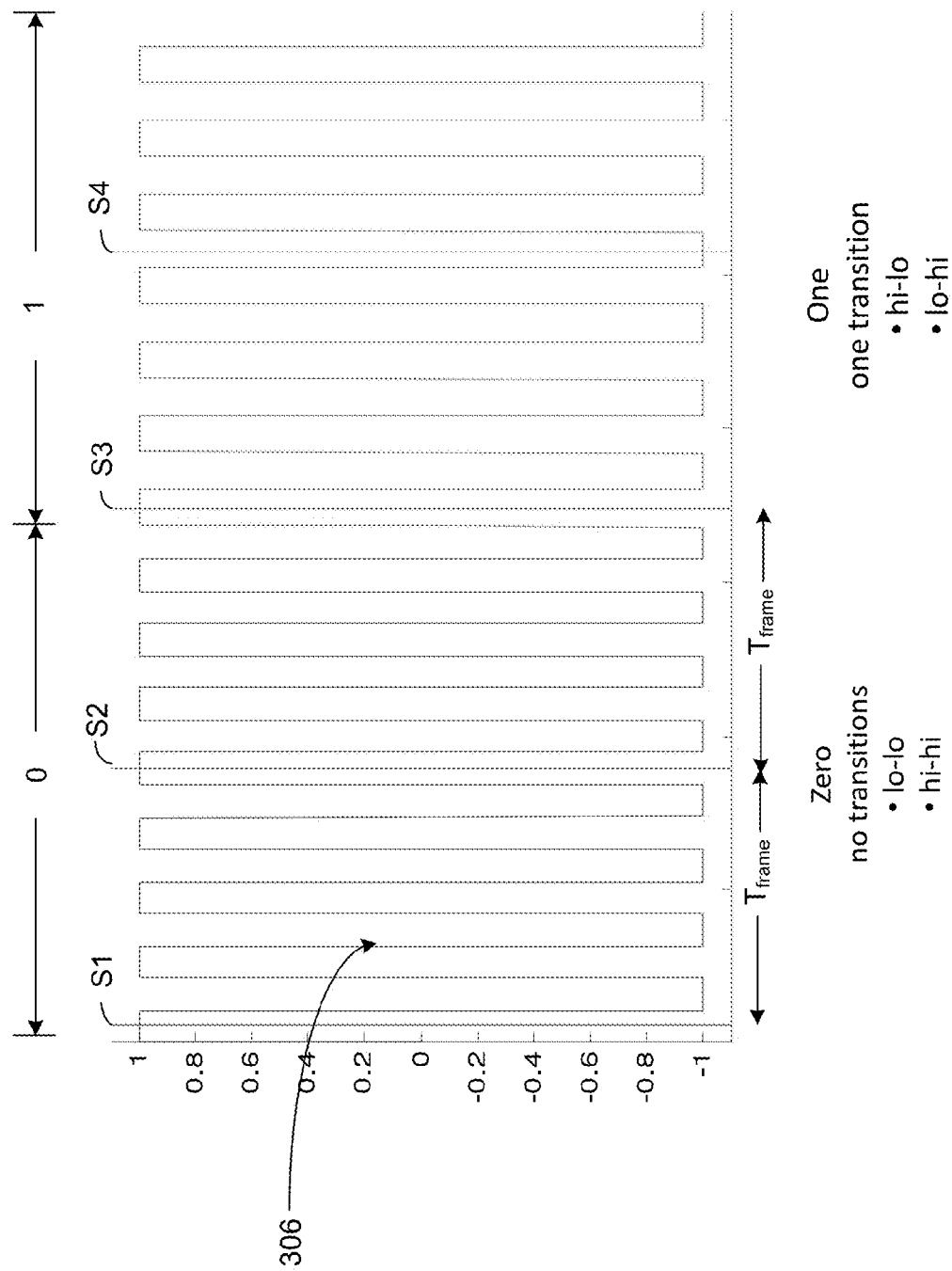
FIG. 5 is a light amplitude/intensity vs. time diagram helpful in understanding how a light receiver detector/demodulator of FIG. 3B associates light samples with demodulated data bits.

FIG. 5 is a light amplitude/intensity (y-axis) vs. time (x-axis) diagram helpful in understanding how SFD detector/demodulator 370b associates light samples 358 with demodulated data bits. In the example of FIG. 5, exemplary light signal 306 conveys a logic 0 followed by a logic 1, i.e., the light is intensity modulated at FSK frequencies F0 and F1 for first and second bit periods, i.e., where each bit period is twice frame period $T_{frame}$. On the diagram of FIG. 5, light intensity values of 1, −1 correspond to light intensity values of ON, OFF, (or HIGH, LOW) respectively. Assuming light 306 impinges on a given one of light detectors 360, then that light detector samples light 306 once every frame period $T_{frame}$ (i.e., twice per bit period), in accordance with a receiver sample timeline, to produce a sequence of time-spaced light samples S1, S2, S3, and S4, with an arbitrary sample phase relative to the bit periods. If light 306 is sampled once per frame period while the FSK waveforms at frequencies F0, F1 may produce 3 or 4 full cycles per frame period, the FSK waveforms are under-sampled compared to the Nyquist rate, i.e., two samples per FSK waveform cycle.

During the first bit, or logic 0, period, the frequency/timing relationship between the 120 Hz ON-OFF keying of light 306 and the light sample spacing, i.e., the frame period $T_{frame}$, causes consecutive light samples S1 and S2 to be in the same intensity state, i.e., at the same level (either ON/HIGH). In the example of FIG. 5, consecutive samples S1 and S2 are both ON. However, the absolute level, e.g., ON or OFF, depends on the sample phase of the receiver sample timeline. Therefore, if two consecutive light samples indicate consecutive same ON-ON or OFF-OFF states, then detector/demodulator 370b associates this condition with, and demodulates, a logic 0.

During the second bit, or logic 1, period, the frequency/timing relationship between the 105 Hz ON-OFF keying of light 306 and the light sample spacing causes successive light samples S3 and S4 to toggle between states either (ON then OFF, or OFF then ON). In the example of FIG. 5, consecutive samples S3 and S4 transition from ON to OFF. However, in other examples, with different sample phases of the receiver sample timeline, S3 and S4 may toggle from OFF to ON. Therefore, if two consecutive light samples indicate a state transition ON-OFF or OFF-ON, then detector/demodulator 370b demodulates a logic 1.

The above-described exemplary demodulation of FSOOK modulated light is based on under-sampling the FSK waveform. Therefore, such demodulation is referred to herein as under-sampled FSOOK (UFSOOK) demodulation.

Modules 370a, 370b also monitor light samples (i.e., images) 358 to detect light modulated with the Illegal frequency, as an indicator of a SFD associated with a light packet. As mentioned above in connection with demodulated data bits, the relationships between the frame period and the frequencies F0, F1 respectively causes detected light in two consecutive images always to be either in the same state, or in different states. However, the relationship between the frame period and the Illegal frequency causes detected light to toggle ON and OFF over four consecutive images in an ON-OFF pattern that cannot occur when the light is modulated at frequencies F0, F1. More specifically, if the light samples indicate any of patterns ON-ON-OFF-OFF, OFF-OFF-ON-ON, ON-OFF-OFF-ON, and OFF-ON-ON-OFF over four consecutive images, then modules 370a, 370b detect the Illegal frequency associated with the data delimiter.

Modules 370a, 370b also monitor light samples 358 to detect light modulated with the HiRate frequency, as an indicator associated with the SFD. An SFD modulated at the HiRate frequency may be more readily detected relative to an SFD modulated at the Illegal frequency when embedded with message data bits (e.g., logic 0, 1) because the HiRate frequency is more easily distinguished from the logic 0, 1 FSK frequencies than the Illegal frequency, which falls between those frequencies.

While light detectors approximately maximally detect frequencies F0, F1 in the modulated light, i.e., produce a near maximum amplitude output in response to the matched frequency, the integration time of the light detectors is too long to respond fully to the much greater HiRate frequency. Therefore, light detectors 360 are suboptimal energy detectors/samplers of the HiRate frequency, and provide an average, e.g., approximately ½ maximum, amplitude output (i.e., sampled output) in response to the HiRate frequency. Therefore, modules 370a, 370b detect the SIT) in modulated light beam 306 when light detectors 360 provide the average, lesser amplitude outputs in response to sequential images. Similarly, in a transmit embodiment in which a reduced light intensity serves as an alternative for the HiRate frequency, light detectors 360 provide an average, lesser amplitude indicative of the reduced light intensity.

From recorded sampled light at a determined position in a sequence of images, modules 370a, 370b demodulate frequencies F0, F1 into data bit logic levels, detect the HiRate frequency, and detect the Illegal frequency associated with the SFD. Modules 370a, 370b also detect the number of frames over which each of the above mentioned frequencies extend. In this way, detector 352 deconstructs or determines the modulated light packets conveyed in the recorded light beam(s). Modules 370a, 370b pass such information to controller 354 over a bidirectional interface 374. For example, over interface 374, modules 370a, 370b indicate detected SFDs from recorded light packets to controller 354, and provide demodulated data bits from the light packets to the controller.

Controller

Controller 354 (also referred to herein as a "protocol processor") includes a memory 376 to store control logic protocol light packet definitions, and a frame period. Controller 354 provides light packet protocol definitions to detector 352 over interface 374. Based on the information from detector 352 and the contents of memory 376, controller 354 operates and controls receiver 308. Controller 354 also controls imager 350 over interface 374, e.g., the controller may command exposure controller 363 to operate in either of the global exposure mode or the line exposure mode.

Multi-Light Transmitter

Figure 6:
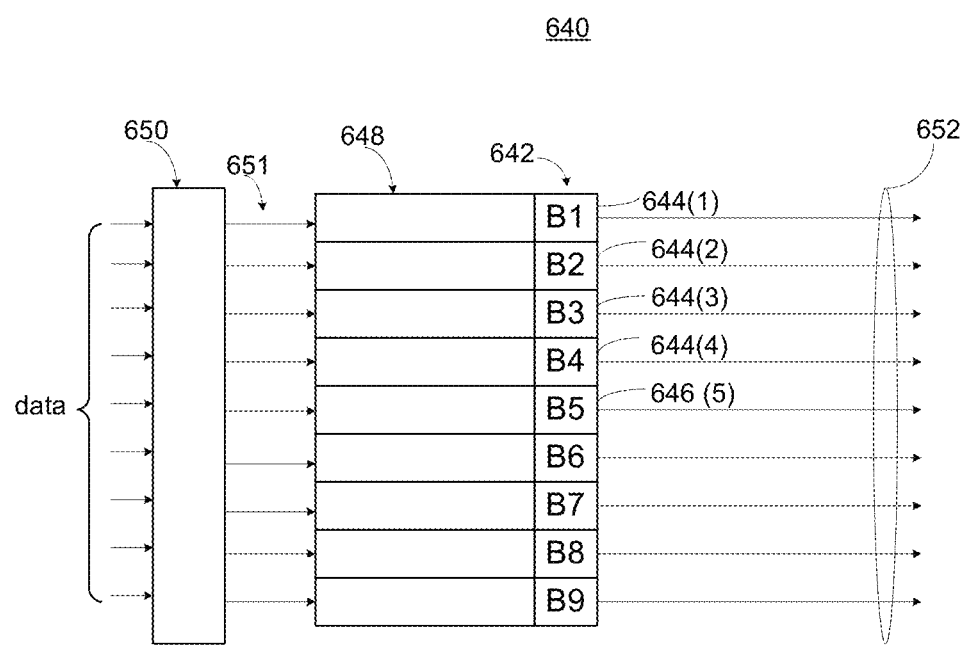
FIG. 6 is a block diagram of an example multi-light transmitter to transmit light packets.

FIG. 6 is a block diagram of an example multi-light transmitter 640 to transmit light packets. Light transmitter 640 includes an array or group of spatially-separated lights 642, which may be spatially-arranged in either 1-dimension or in 2-dimensions.

Transmitter 640 includes light modulators 648, which may be implemented similarly to modulator 309 in FIG. 3, each to modulated light from a corresponding one of lights 642. Transmitter 640 may include a controller 650, including memory and one or more clock and timer circuits similar to those of controller 314. Controller 650 receives multiple parallel data inputs (e.g., one per light modulator) from data sources not shown, and generates modulator commands 651 in parallel to control multiple modulators 648, similar to the manner in which commands 320 control modulator 309. In an alternative embodiment, controllers, such as controller 314, may be incorporated into each of modulators 648 separately.

In response to commands 651, modulators 648 modulate their corresponding lights 642 to transmit their respective light packets in spatially-separated light beams 652 according to the light packet definition of FIG. 4B, to convey data bits received over the data inputs. In response to commands 651, modulators/lights 648/642 may transmit their respective light packets with any number of different inter-packet timing relationships. For example, modulators/lights 648/642 may transmit their respective light packets simultaneously with each other. Alternatively, the light packets may be transmitted in a serial manner, one after the other. Alternatively, the light packets may be transmitted with their respective start times offset slightly with respect to each other. Any combination of such inter-packet timing relationships is possible.

In an alternative embodiment, some of lights 642 may modulate their respective light beams, while others may transmit unmodulated light beams.

Photogrammetric Light Communications Positioning (PG-LCP)

Photogrammetric light position determination of a light receiver relative to a light transmitter is now described. Photogrammetric light position determination is also referred to herein as "photogrammetric light communications positioning" (PG-LCP).

Figure 7:
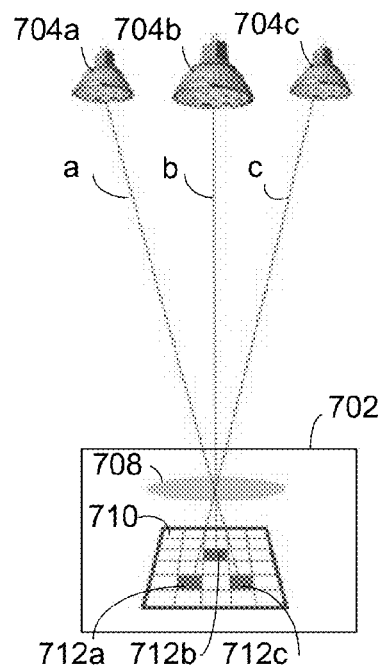
FIG. 7 is a light diagram useful to introduce the principles of photogrammetric position determination of a light receiver.

FIG. 7 is a light diagram useful to introduce the principles of photogrammetric position determination of a light receiver 702. Spatially-separated lights 704a, 704b, and 704c of a light array transmit respective spatially-separated light beams a, b, and c to light receiver 702, which includes an imaging lens 708 and a light sensor 710. Light beams a, b, c project through lens 708 onto light sensor 710, and illuminate light detectors (or sensor pixels) at spatially-separated positions 712a, 712b, 712c. The relationship between positions 712a, 712b, 712c and a focal point of lens 708 forms multiple triangles having vertices at lights 704 and light receiver 702. Assuming that real-world positions, e.g., <x, y, z> coordinates, for lights 704 and their corresponding image/sensor positions 712 are known, a real-world position of lens 708 relative to the positions of lights 704 may be determined based on the triangles. Therefore, a real-world position of light receiver 702 relative to lights 704 may be determined. This is referred to as photogrammetric position determination (or positioning), as would be appreciated by those of ordinary skill in the relevant arts. Photogrammetric equations are provided below and described in connection with FIG. 19.

Figure 8:
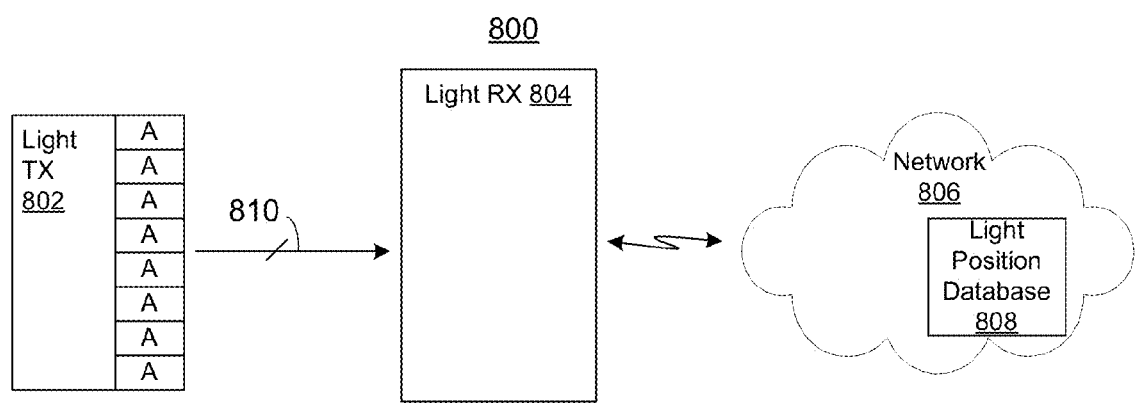
FIG. 8 is a system for photogrammetric position determination, according to an embodiment.

Photogrammetric position determination requires knowledge of both the real-world position and the corresponding, or matching, image positions of the lights upon which the determination is based. Each light is associated with two positions, namely, its real-world position and its corresponding/matching image position. The real-world positions may be ascertained explicitly. For example, each light may transmit modulated light to indicate a unique light identifier. The light receiver recovers the IDs from the modulated light, and then retrieves real-world positions of the lights from a database of light positions, e.g., <x, y, z> coordinates, indexed by the IDs. In this way, the real-world light positions are said to be explicitly determined because all of the lights provide their IDs explicitly, from whence their positions in the database may be accessed/determined FIG. 8 is a system 800 in which photogrammetric position determination may be performed, according to an embodiment. System 800 includes a light transmitter (TX) 802 to transmit light to a light receiver 804, which communicates in turn with a network 806, which may include the Internet. A light position database 808 may reside on a cloud-based server accessible through network 806. Light position database 808 stores predetermined, real-world positions (e.g., <x, y, z> coordinates) of lights, as the lights are deployed in light arrays, e.g., in buildings, such as a shopping mall. The real-world light positions may be indexed, or addressed, by one or more unique light IDs of the lights deployed in the light arrays. In an example, light position database 808 is configured as a light position table that lists light IDs against their corresponding real-world positions.

Light transmitter 802 and light receiver 804 may be configured to operate similarly to multiple light transmitter 640 and light receiver 308, respectively. Light transmitter 802 includes multiple spatially-separated lights A to transmit spatially-separated light beams 810, each FSOOK modulated to indicate an SFD and a unique light ID, e.g., as described in light packet definition 450 of FIG. 4B, where the light ID may comprise some or all of the series of bits B1-B10. For example, bits B1 through B5 may be designated as light ID bits to carry an exemplary light ID "00011." Lights A and their modulated light beams 810 are referred to herein as "anchor lights" or "modulated lights" and "anchor light beams" or "modulated light beams," respectively.

Light receiver 804 samples and records spatially-separated anchor light beams 810 in a sequence of recorded images representing lights A of light transmitter 802. Light receiver determines positions (i.e., image positions) of the recorded anchor light beams in the recorded images. Light receiver 804 detects the unique light IDs from each of the recorded anchor light beams 810 using, e.g., UFSOOK demodulation. Using the detected light IDs as an index into light position database 808, light receiver 804 accesses/retrieves the real-world positions of each of anchor lights A associated with the detected anchor light IDs. In an alternative embodiment, light position database 808 may be stored in a local memory of light receiver 804, i.e., the real-world light positions are collocated with the light receiver. In such an embodiment, the light receiver simply accesses its local memory for the relevant real-world light positions. In yet another embodiment that obviates the need for accessing a light position database, each light beam is modulated to indicate the real-world position of its originating light, in lieu of, or in addition to, the ID. In this embodiment, light receiver 804 demodulates the real-world position from each corresponding recorded light beam and, therefore, need not access a database.

Light receiver 804 photogrammetrically determines a 3-dimensional position of the light receiver relative to light transmitter 802 based on (i) the retrieved real-world positions of the lights A and (ii) the corresponding/matching already known positions of the recorded light beams in the recorded images. The photogrammetric position determination may be performed in accordance with the equations described below in connection with FIG. 19.

The following is an example message that receiver 804 transmits to map database 808 requesting light positions indexed by the detected (i.e., observed) anchor IDs:

Observed_Anchor_IDs, [number observed (3)],[Anchor IDs (1,5,6)]

In response, the server storing light position database 808 returns light positions 1010 along with the following information:

[number of light anchors in map (3)], [Anchor ID numbers (1,5,6)], [Light Anchor locations <x1,y1,z1>,<x5,y5,z5>,<x6,y6,z6>], Method Flowchart FIG. 9 is a flowchart of an example method 900 summarizing photogrammetric position determination of a light receiver relative to a light transmitter.

905 includes, in a light receiver, sampling and recording spatially-separated, modulated anchor (i.e., modulated) light beams from anchor (i.e., modulated) lights of a light array, to produce a sequence of images of the light array. The light receiver may be a camera that "shoots" a short video of the light array, to produce the sequence of images. In an embodiment, the anchor light beams each comprises light modulated to indicate an SFD, followed by a unique light ID that is a series of bits, such as "0110," etc., each bit represented as light that is intensity modulated, e.g., FSOOK modulated, over a bit period at one of multiple FSK frequencies indicative of the bit.

910 includes determining positions in the images where the modulated anchor light beams are recorded, and then demodulating, from the determined positions, the light IDs from the recorded anchor light beams. The demodulating may include UFSOOK demodulating the recorded anchor light beams.

915 includes accessing real-world positions of the lights as deployed in the light array based on the demodulated light IDs. Such accessing may include transmitting, to a light position database residing in a network, a request for the real-world light positions of the lights having the demodulated light IDs, and receiving the requested real-world light positions (e.g., in a table).

930 includes photogrammetrically determining a 3-dimensional, position of the light receiver relative to the light array based on the real-world light positions accessed in 915 and the determined positions of the light beams in the recorded images. The photogrammetrically determining may include determining the position according to the photogrammetric technique described below in connection with FIG. 19.

Integrated Photogrammetric Light Communications Positioning (PG-LCP) and Ins Positioning Photogrammetric light communications positioning (PG-LCP) tends to provide infrequent yet relatively accurate position estimates with relatively stable errors over time. On the other hand, INS positioning tends to provide frequent and continuous navigations solutions, e.g., position, velocity, and orientation estimates, with relatively unstable and diverging errors over time. Therefore, PG-LCP and INS positioning have complementary advantages, and when integrated together as described below, provide an improved positioning system. The INS subsystem provides relatively rapid position estimates, while the PG-LCP subsystem provides accurate, less frequent position estimates advantageously used to confine the errors of the INS position estimates.

Accordingly, described below are embodiments in which a PG-LCP subsystem and an INS subsystem are integrated together, to provide an integrated PG-LCP and INS positioning system. The integrated PG-LCP and INS positioning system provides improved position determination of a mobile device. Benefits of the integrated PG-LCP and INS positioning system include a reduced dependence on physical infrastructure such as light fixtures in buildings, and a higher tolerance to impaired line-of-sight conditions.

Before describing integrated positioning system embodiments, separate INS and PG-LCP systems are described for context.

Inertial Navigation System (INS)

Figure 10:
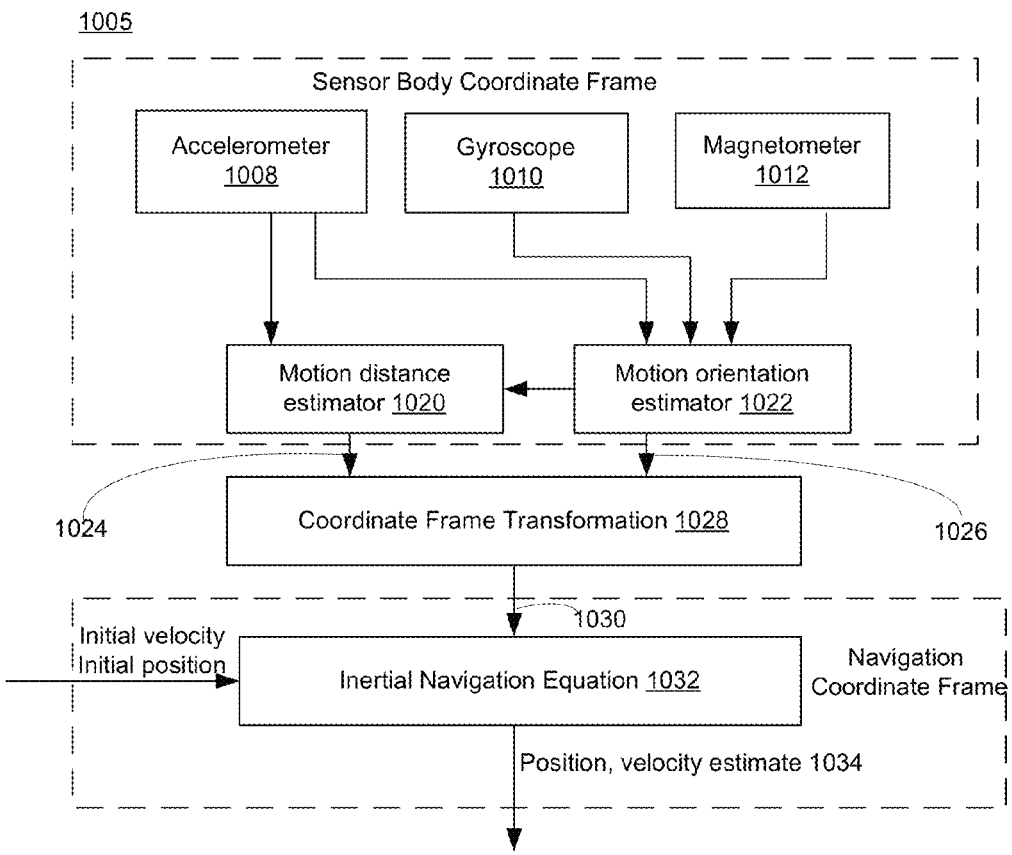
FIG. 10 is a block diagram of an example Inertial Navigation System (INS) to track movements/motion of a device to which the INS is attached.

FIG. 10 is a block diagram of an example INS 1005 to track movements/motion of a device to which the INS is attached. INS 1005 includes Inertial Measurement Unit (IMU) sensors comprising the following inertial sensors to measure respective inertial quantities: an accelerometer 1008 to measure acceleration; a gyroscope 1010 to measure a rate of rotation indicative of orientation; and a magnetometer 1012 to measure the Earth's magnetic field. The IMU sensors may be configured as MEMS sensors. The IMU sensors make respective inertial measurements of acceleration, rotation/orientation, and magnetic field, relative to their sensor body coordinate frame, i.e., a coordinate frame centered on the sensors themselves.

INS 1005 also includes a motion distance estimator 1020 and a motion orientation estimator 1022. Motion distance estimator 1020 tracks a distance traveled by the device based on the measured acceleration from accelerometer 1008, to produce an estimated distance 1024 in sensor body coordinates. Motion orientation estimator 1022 tracks an orientation of the movements of the device, based on the measured acceleration, orientation, and magnetic field from accelerometer 1008, gyroscope 1010, and magnetometer 1012, respectively. As a result, estimator 1022 produces an estimated orientation 1026 in the sensor body coordinate frame.

INS 1005 also includes a coordinate frame transformation block 1028 to transform estimates 1024, 1026 from the sensor body coordinate frame (i.e., from sensor body coordinates) to a navigation coordinate frame, to produce transformed distance and orientation estimates 1030, from which a navigation solution may be determined. The transformation to the navigation coordinate frame is required to enable derivation of an absolute position, with respect to the navigation coordinate frame. To this end, an inertial navigation equation block 1032 derives position (and distance travelled) and velocity estimates 1034 based on transformed estimates 1030, and an initial position and an initial velocity also input to block 1032.

The manner in which distance is derived may depend on whether accelerometer 1008 is securely, or alternatively, loosely, attached to the device.

Figure 11:
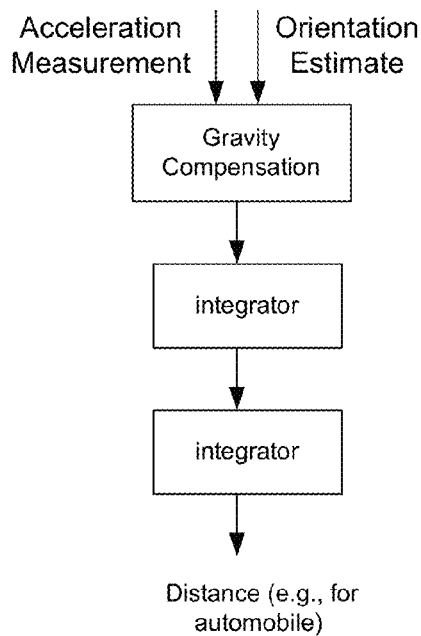
FIG. 11 is a block diagram an example of deriving distance when an accelerometer is securely attached to a device.

FIG. 11 is a block diagram an example of deriving distance when accelerometer 1008 is securely attached to the device (e.g., the accelerometer is attached to a land vehicle, such an automobile). First, gravity compensation is performed based on the measured acceleration and an orientation estimate from estimator 1022. Then, the gravity compensated measured acceleration is integrated twice to derive the distance traveled.

Figure 12:
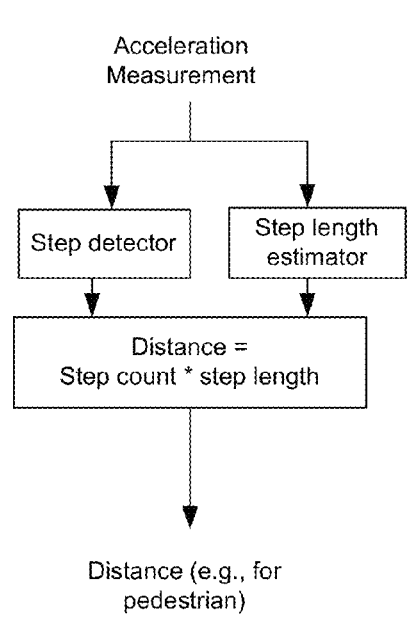
FIG. 12 is a block diagram an example of deriving distance when an accelerometer is loosely attached to a device.

FIG. 12 is a block diagram an example of deriving distance when accelerometer 1008 is loosely attached to the device (e.g., the accelerometer is installed in a mobile phone, such as a smartphone, carried by a pedestrian). First, a step detector determines when each step occurs, and a step length estimator estimates a length of each detected step. Distance is then derived based on the number of detected steps and their respective estimated step lengths.

Photogrammetric Light Communications Positioning (PG-LCP)

Figure 13:
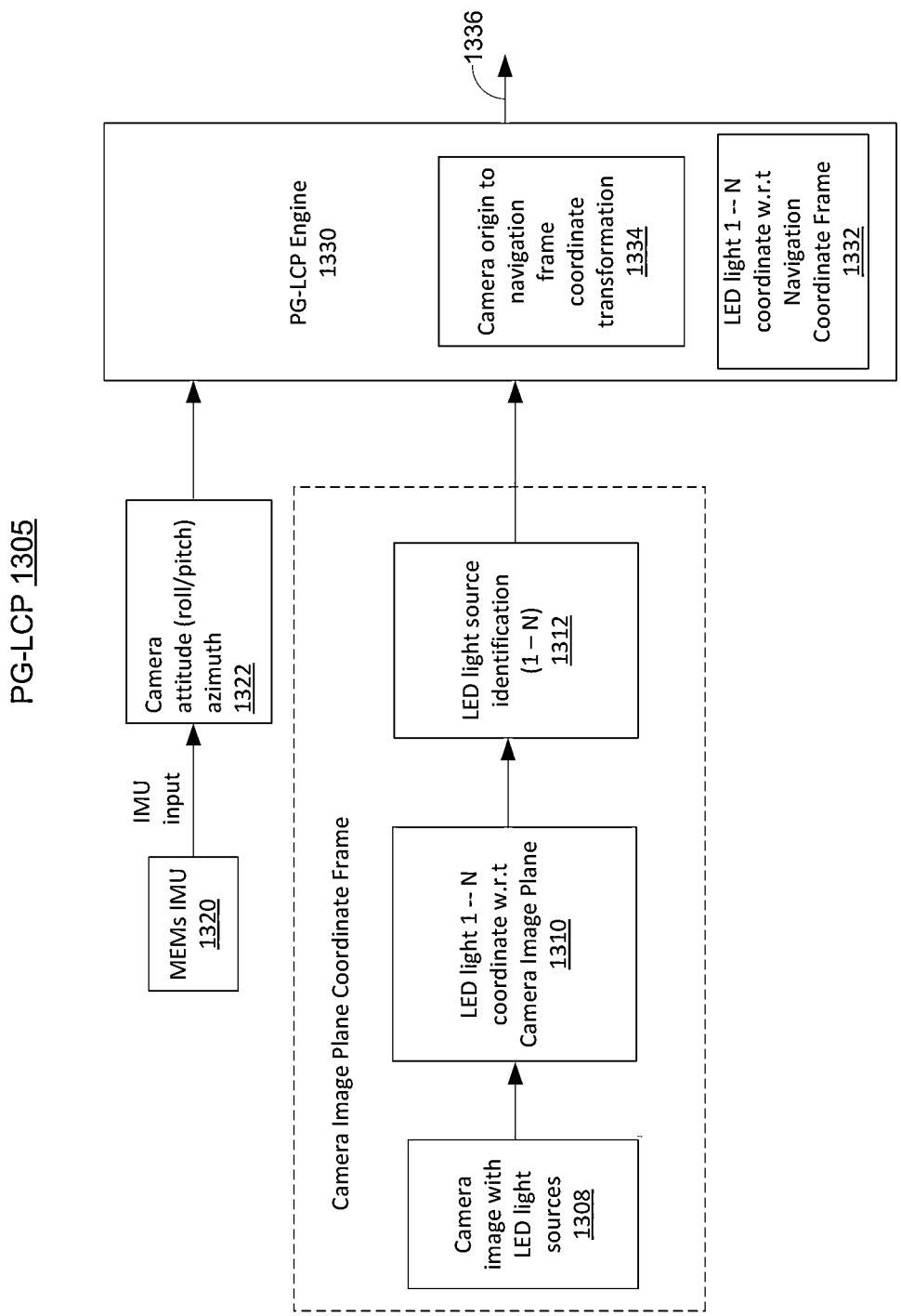
FIG. 13 is a functional block diagram of an example photogrammetric light communications positioning (PG-LCP) system.
Figure 19:
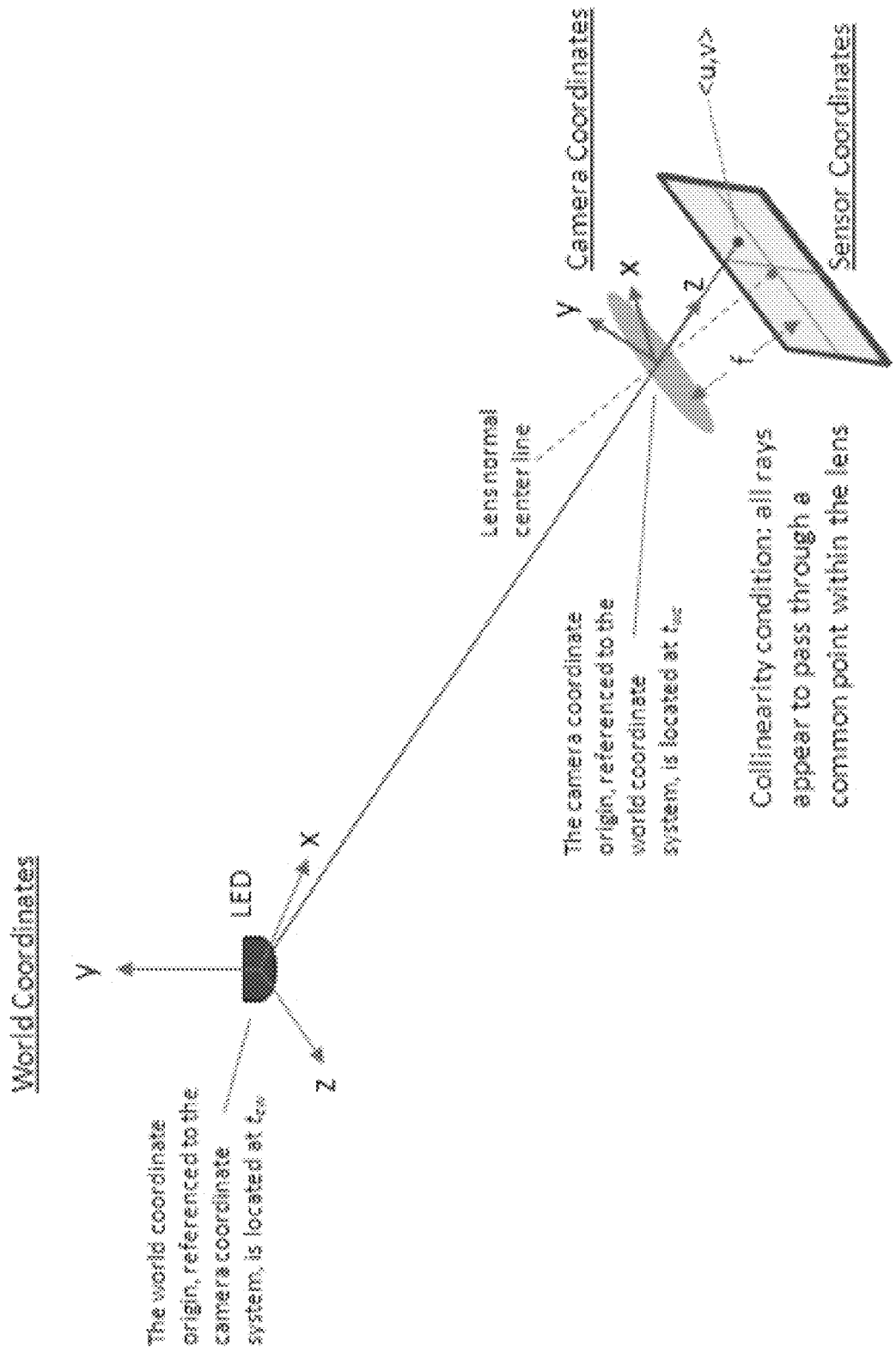
FIG. 19 is an illustration helpful in describing the principle of photogrammetric positioning, In the drawings, the leftmost digit(s) of a reference number identifies the drawing in which the reference number first appears.

While PG-LCP was described above in connection with FIGS. 7-9, and 19, it is now described again in brief in connection with FIG. 13, to introduce camera-to-navigation coordinate transformation and IMU blocks. Reference will also be made to FIG. 19 and equations 7-23 described below under the section entitled "General Treatment of Photogrammetric Positioning."

FIG. 13 is a functional block diagram of an example PG-LCP system 1305. Blocks depicted in FIG. 13 may depict function/process, components, or both, as will be apparent from the ensuing description. In FIG. 13, the term "camera" denotes a light receiver (e.g., light receiver 308 depicted in FIG. 3B) capable of recording light beams as a sequence of light images and processing the recorded light beams as images as described above. Also, in FIG. 13, the term "w.r.t" means "with respect/reference to."

At block 1308, the camera records modulated light beams from LEDs having light IDs 1-N at corresponding image positions in a sequence of images. The light beams may be FSOOK modulated to convey their originating LED light IDs 1-N. Each of the images is captured/recorded in an image plane of the camera, e.g., an image plane corresponding to light detector array 359 depicted in FIG. 3C.

At block 1310, the image positions of the recorded light beams corresponding to LEDs 1-N are determined. The determined image positions are referenced to a coordinate frame of the camera, i.e., a camera image plane coordinate frame. Accordingly, the recorded beam image positions have coordinates corresponding to "sensor coordinates <u, v>" in FIG. 19.

At block 1312, the recorded light beams are demodulated from their determined, recorded, image positions to recover their respective IDs.

Photogrammetric light positioning uses inertial measurements. See, e.g., equations 11-13 discussed below in connection with FIG. 19 under the section entitled "General Treatment of Photogrammetric Positioning." To this end, a MEMS IMU 1320 measures inertial quantities, e.g., acceleration, orientation, and the Earth's magnetic field. A block 1322 converts the measured inertial quantities from IMU 1320 to a camera attitude or inclination (i.e., pitch and roll), and a camera azimuth that are used in a next stage of photogrammetric processing.

System 1305 includes a PG-LCP Engine 1330 to photogrammetrically determine a position of the device based on various inputs, in accordance with the equations 7-23 described below under the section entitled "General Treatment of Photogrammetric Positioning." Specifically, PG-LCP Engine 1330 retrieves real-world positions 1332 of the lights, as actually deployed in their respective light arrays, based on the IDs demodulated at block 1312. The real-world positions (referenced as LED "world coordinates" in FIG. 19) are referenced to a navigation coordinate frame. PG-LCP Engine 1330 also receives the camera attitude and azimuth quantities from block 1322. A transform block 1334 of PG-LCP Engine 1330 transforms recorded light beam image positions from the image plane coordinate frame to the navigation coordinate frame.

PG-LCP engine 1330 photogrammetrically determines a camera position 1336 in the navigation (i.e., real-world) coordinate frame, based on the transformed light beam image positions, their corresponding/matching real-world positions, and the camera attitude and azimuth, in accordance with the equations 7-23 described below under the section entitled "General Treatment of Photogrammetric Positioning."

Photogrammetrically determined position 1336 is also referred to herein as "a PG-LCP position update," "a PG-LCP position estimate," and "PG-LCP measurement."

Integrated Photogrammetric Light Communication Positioning (PG-LCP) and Ins Positioning Embodiments Embodiments directed to integrated PG-LCP and INS positioning are now described.

First a mathematical treatment is provided, using the following notation conventions:
x: denotes a true value of x
$\hat{x}$: denotes a calculated (i.e., estimated) value of x
$\hat{x}^-$: denotes a calculated value of x before a measurement update
$\hat{x}^+$: denotes a calculated value of x after the measurement update
$\tilde{x}$: denotes a measured value of x A generic system kinematic model is described as $$\dot{x}=f(x,u) \quad \text{Eq. 1}$$

where x represents the kinematic state, which generally includes position, orientation, velocity, etc., and u represents the kinematic input from sensors. Kinematics is a branch of classical mechanics that describes the motion of bodies. The "kinematic state" describes a motion at a given measurement update. The "dot" atop x indicates a derivative of x.

For INS, the navigation mechanization equations can then be described as:

$$\dot{\hat{x}}=f(\hat{x},\tilde{u})$$

Where $\hat{x}$ is the estimated value of a system kinematic state (e.g., position, orientation, velocity, etc.), and $\tilde{u}$ represents the inertial sensor measurement values. Samples of $\tilde{u}$ are available at the sample rate, f1.

On the other hand, PG-LCP is treated as providing "aiding" measurement updates to the INS at a rate f2 that is asynchronous to the INS measured update rate f1, where f1>>f2, i.e., the PG-LCP measurement updates occur at a much lower rate than the INS measurement updates.

Embodiments of integrated PG-LCP and INS positioning include (i) a loosely coupled embodiment, and (ii) a tightly coupled embodiment.

Loosely Coupled Embodiment

In the loosely coupled embodiment, first, an INS position estimate and a PG-LCP position estimate are derived independently. For example, an INS subsystem derives the kinematic state estimate, and a PG-LCP subsystem derives its position estimate. Then, the separately derived INS and PG-LCP position estimates are combined with filtering to estimate/track an INS position estimate error, and compensate for that error based on assumed error models for INS and PG-LCP, introduced below. More specifically, let x(t) represent the system kinematic state, which generally includes position, orientation, velocity, etc. Then, represent:

$$\text{INS dynamics as: } x(t)=f(x(t),u(t))+w(t) \qquad \text{Eq. 2}$$

$$\text{And PG-LCP dynamics as: } y(t)=x(t)+v(t) \qquad \text{Eq. 3}$$

where u(t) is the inertial sensor input signal, w(t), v(t) are assumed additive uncorrelated white noise processes. Eq. 2 follows from Eq. 1, with additional white noise w(t) to account for inertial sensor measurement noise. The INS integrates u(t) based on system dynamics Eq. 2 to provide the INS state estimation. Eq. 3 indicates that the system will predict the PG-LCP position estimation to be the INS kinematic state estimation plus white noise v(t). The difference between the PG-LCP estimation (measured $\tilde{y}$ value) and the INS estimation (calculated $\hat{y}$ value $\hat{y}=\hat{x}$) will serve as the residue measurement, $z=\tilde{y}-\hat{y}$, which contains both the measurement noise as well as the information about the INS kinematic state estimation errors. Filtering aims to remove the measurement noise and provide an accurate estimation of INS kinematic estimation errors δx. The δx is then fed back to the INS to provide a best estimate of the total state after the measurement update from the PG-LCP:

$$\hat{x}^+=\hat{x}^-+\delta x \qquad \text{Eq. 4}$$

Common nonlinear filtering techniques may applied, including a Linearized Kalman filter, an Extended Kalman filter, an unscented Kalman filter or a Particle filter.

Figure 14:
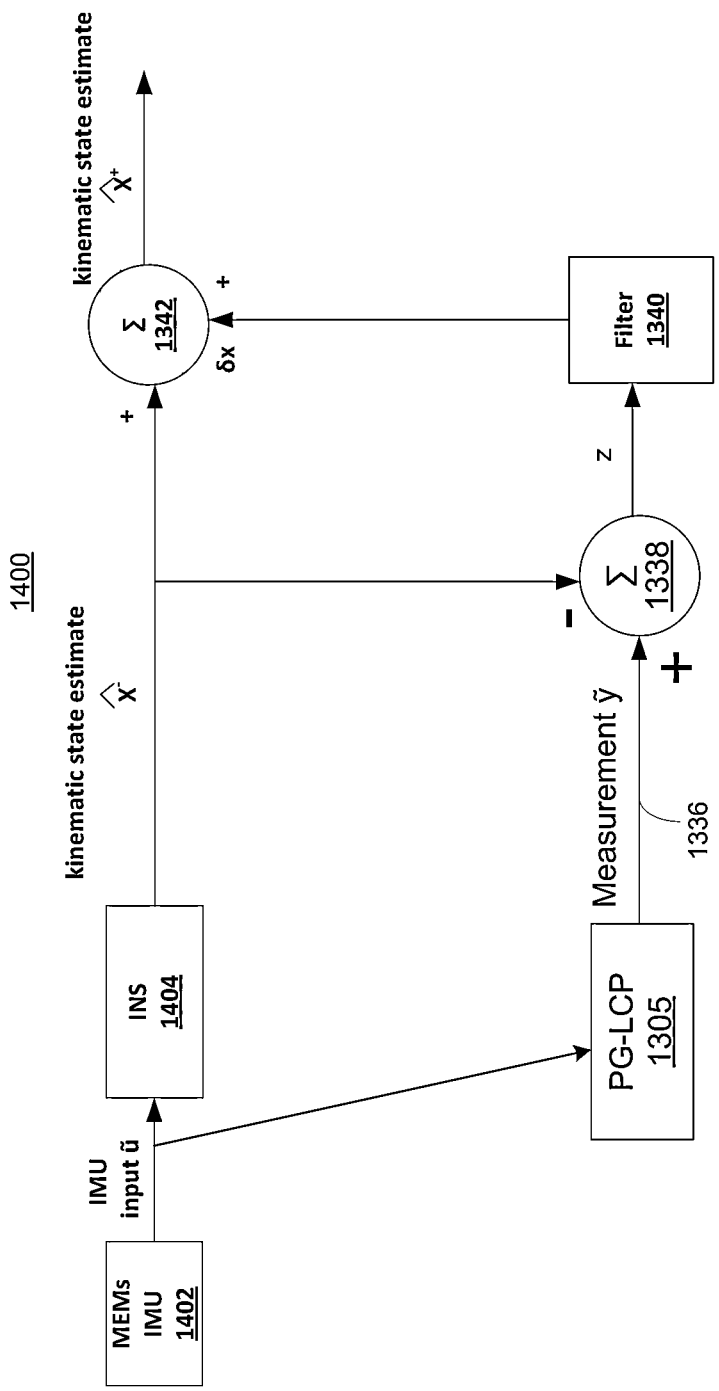
FIG. 14 is a functional block diagram of an example loosely-coupled integrated PG-LCP and INS positioning system.

FIG. 14 is a functional block diagram of an example loosely-coupled, integrated PG-LCP and INS positioning system 1400.

System 1400 includes a MEMs IMU 1402 to measure inertial quantities and provide inertial measurements it as inputs to an INS 1404, which may be configured similarly to the INSs of FIGS. 12A-12C. INS 1404 derives a kinematic state estimate $\hat{x}^-$ based on the inertial measurements $\tilde{u}$. INS 1404 repeatedly derives the kinematic state estimate $\hat{x}^-$ at the rate f1 at which it receives inertial measurements. MEMS IMU 1402 and INS 1404 together comprise an INS subsystem of integrated PC-LC and INS positioning system 1400.

System 1400 also includes PG-LCP system 1305 configured as described in connection with FIG. 13, to produce photogrammetrically determined position 1336, also referred to as measurement $\tilde{y}$. PG-LCP 1305 repeatedly derives position 1336 at the rate f2. PG-LCP system 1305 comprises a PG-LCP subsystem of integrated PG-LCP and INS positioning system 1400.

A subtractor 1338 subtracts kinematic state estimate $\hat{x}^-$ from measurement $\tilde{y}$, to produce kinematic (INS) estimation error, or residue measurement, z. A filter 1340 filters estimation error z over time to produce a filtered error correction δx.

A combiner 1342 sums kinematic state estimate $\hat{x}^-$ with filtered error correction δx to produce a corrected kinematic state estimate $\hat{x}^+$, which is fed back into the INS for the next measurement/estimate update. The cycle repeats. In this way, position estimates from PG-LCP system 1305 confine the estimate errors from INS 1404.

Tightly Coupled Embodiment

In the tightly coupled embodiment, a PG-LCP subsystem does not derive a photogrammetric position independently from the INS, rather, the INS kinematic state estimation is fed into the PG-LCP subsystem to account for the fact that the PG-LCP position estimate itself is affected by the INS kinematic state. Accordingly, the PG-LCP subsystem derives a photogrammetric position based on the INS derived state estimations, and this photogrammetric position is used as a basis for correcting the INS state estimation errors.

Mathematically, again, let x(t) represent the system kinematic state, which can generally include position, orientation, velocity, etc., there is the following for the tightly coupled embodiment:

$$\text{INS dynamics as: } x(t)=f(x(t),u(t))+w(t) \qquad \text{Eq. 5}$$

$$\text{And PG-LCP measurement dynamics as: } y(t)=h(x(t),s(t))+v(t) \qquad \text{Eq. 6}$$

where, again, w(t), v(t) are assumed additive uncorrelated white noise processes, u(t) is the inertial sensor input signal. What is different from the loosely coupled embodiment is that, instead of being treated as a separate independent measurement, the PG-LCP measurement (position) is now treated as a function of the INS kinematic state estimate and the image sensor measurement s(t), as defined in Eq. 6.

Hence, the residue measurement is $z=\tilde{y}-h(\widehat{x(t)},\widetilde{s(t)})$, which is in turn used to track the INS kinematic estimation error(s) δx. The error δx is then fed back to the INS to provide a best estimate of the total state after the measurement update from PG-LCP, similar to Eq. 4. The tightly coupled embodiment uses the estimate of the INS kinematic state to alter the PG-LCP functions (blocks), internally, which can lead to a performance improvement over the loosely coupled embodiment.

As mentioned above, the PG-LCP position measurement itself is affected by the INS kinematic state. Therefore, the PG-LCP subsystem advantageously uses the INS kinematic state in the tightly coupled embodiment, as will be described below in connection with FIG. 15.

Figure 15:
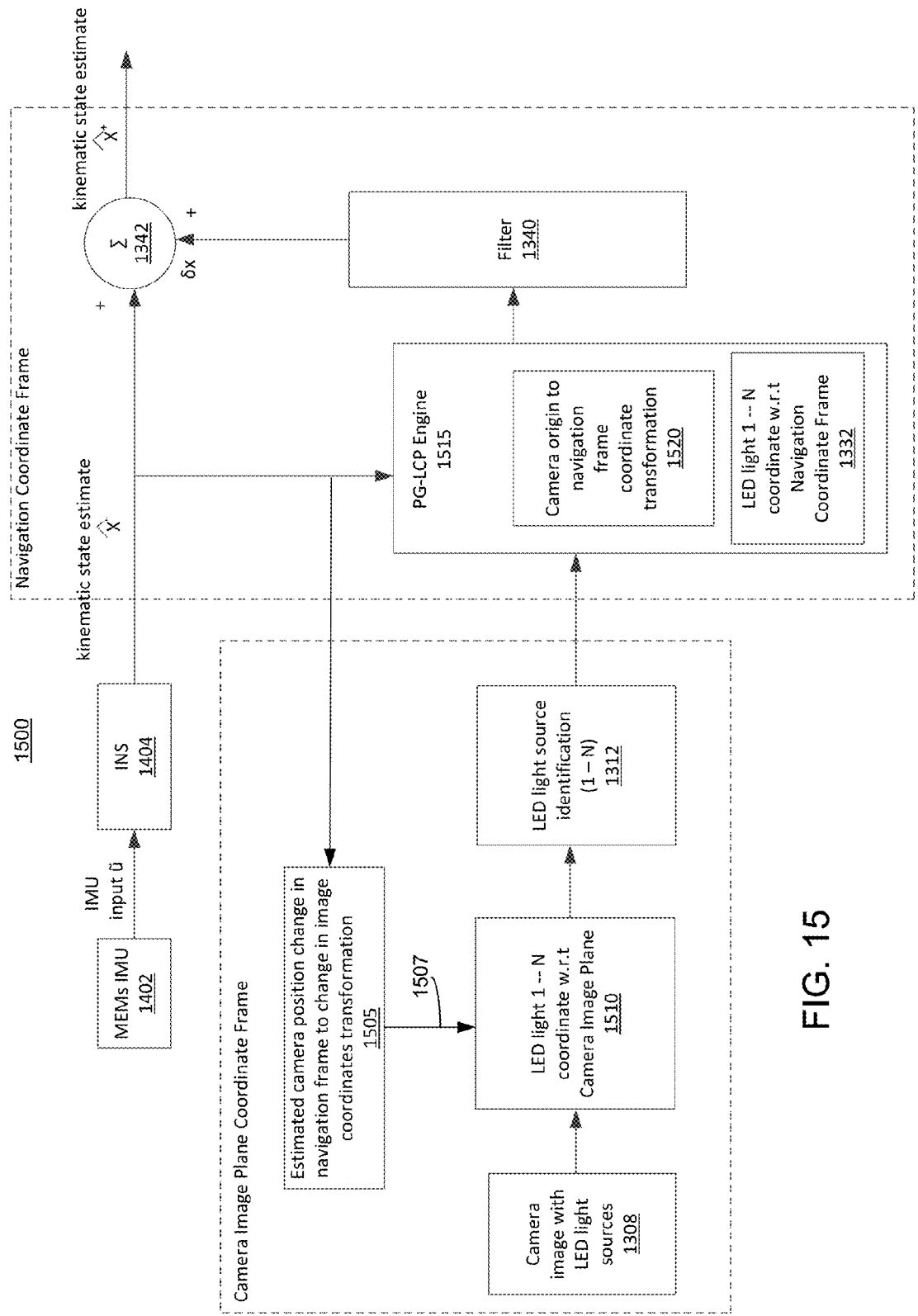
FIG. 15 is a functional block diagram of an example tightly-coupled integrated PG-LCP and INS positioning system.

FIG. 15 is a functional block diagram of an example tightly-coupled, integrated PG-LCP and INS positioning system 1500, according to an embodiment. Blocks in FIG. 15 that were described above in connection with FIGS. 13 and 14 will not be described again here. The system kinematic state affects the PG-LCP subsystem in the following ways:

a. System Kinematic State Affects Light ID Demodulation:

In PG-LCP, the camera (e.g., light receiver) identifies light sources as has been described above, namely: first, modulated light beams are recorded at image positions in a sequence of images over a short period of time (e.g., over a 1 second period); then, the recorded light is demodulated at each of the image positions to recover the light IDs. If the camera moves during the recording period, the light features of interest, i.e., the positions at which the light beams impinge on the camera image plane, will, correspondingly, move, i.e., the light beams will move across the camera image plane.

The INS derived kinematic state essentially tracks how the camera moves during the recording period. Therefore, the PG-LCP uses the kinematic state to track how the light beams move across the camera image plane. In other words, the PG-LCP uses the kinematic state to predict where the light beam image positions will move over time, so that the PG-LCP can continue to demodulate the light beams while the light beam positions move as the camera moves.

With reference to FIG. 15, a block 1505, associated with the PG-LCP, transforms the kinematic state estimate $\hat{x}^-$ (derived by INS 1404) from the navigation coordinate frame to the camera image plane coordinate frame, to produce a coordinate-transformed kinematic state estimate 1507 usable by the PG-LCP. Specifically, block 1510 tracks the image positions of impinging light beams (in the camera image plane coordinate frame) as the light beams moves across the camera image plane, based on the coordinate-transformed kinematic state estimate 1507. Block 1312 is then able to more accurately demodulate the IDs from the tracked light beam positions on the image plane.

b. System Kinematic State Affects PG-LCP Ranging and Location Estimation:

Both PG-LCP coordinate frame transformation and ranging equations (described below under the section entitled "General Treatment of Photogrammetric Positioning") performed in PG-LCP Engine 1515 rely on the accuracy of camera orientation estimation. Therefore, the error compensated INS kinematic state $\hat{x}^-$ is also fed to the PG-LCP coordinate frame transformation module 1520 and the ranging equations of PG-LCP Engine 1515, as depicted in FIG. 15. This improves the accuracy of the PG-LCP position estimates, which in turn, helps to closely track the INS error state, so as to improve the overall INS accuracy.

Method Flowcharts

Figure 16A:
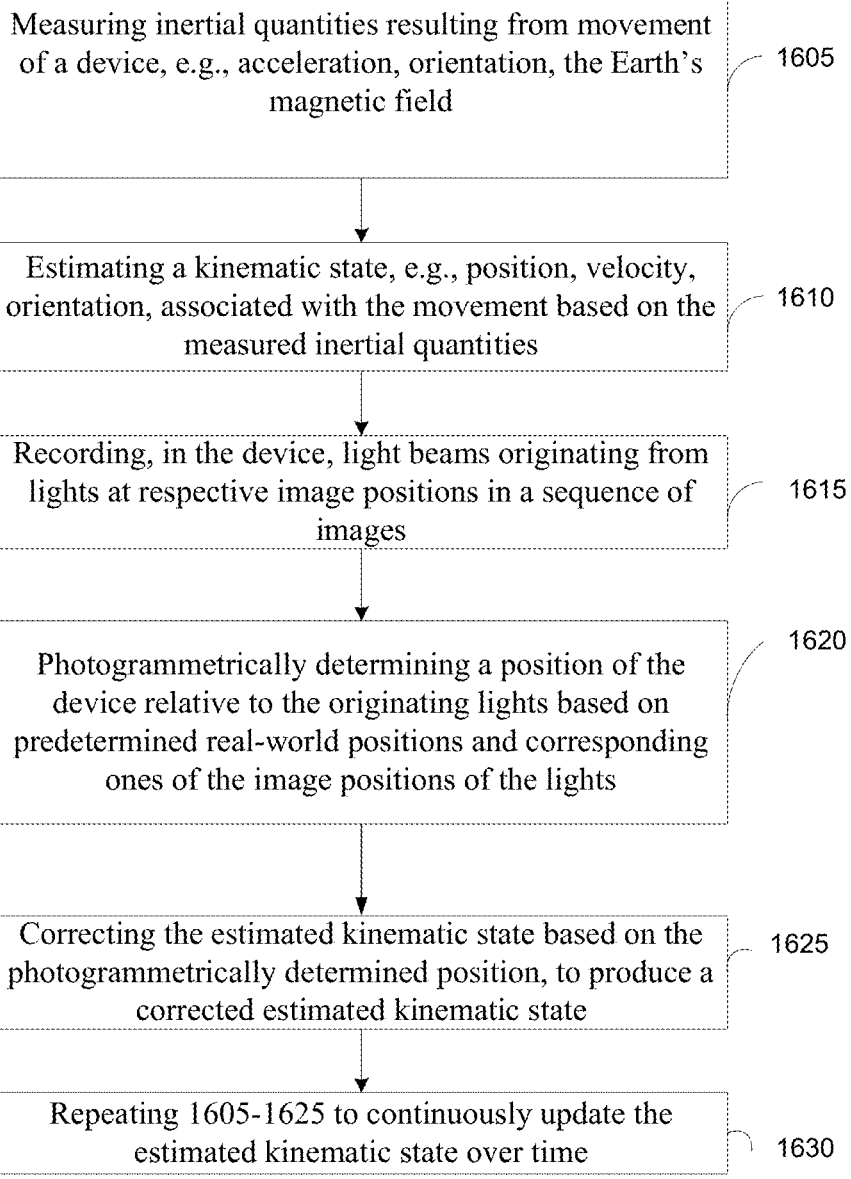
FIG. 16A is a flowchart of an example method summarizing integrated PG-LCP and INS positioning, according to both the loosely and tightly coupled embodiments.

FIG. 16A is a flowchart of an example method 1600 summarizing integrated photogrammetric light communications (PG-LCP) and INS positioning, according to both the loosely and tightly coupled embodiments described above.

1605 includes measuring inertial quantities resulting from movement of a device, e.g., acceleration, orientation. This may include measuring the Earth's magnetic field.

1610 includes estimating a kinematic state, e.g., estimating position, velocity, orientation, associated with the movement based on the measured inertial quantities.

1615 includes recording, in the device, e.g., in a light receiver portion of the device, light beams originating from lights at respective image positions in a sequence of images.

1620 includes photogrammetrically determining a position of the device relative to the originating lights based on predetermined real-world positions and corresponding ones of the image positions of the lights.

In the tightly coupled embodiment, 1620 includes photogrammetrically determining the position of the device based on (i) the estimated kinematic state from 1610, which may include estimated position, velocity, and orientation, and (ii) the real-world and image positions of the originating lights. That is, the estimated kinematic state is used in the equations 7-23 described below under the section entitled "General Treatment of Photogrammetric Positioning," as appropriate. Also, in the tightly coupled embodiment, the estimated kinematic state is used in determining the real-world positions of the lights, as will be described below in connection with FIG. 16C.

1625 includes correcting the estimated kinematic state based on the photogrammetrically determined position, to produce a corrected, estimated kinematic state.

1630 includes repeating 1605-1625 to continuously update the estimated kinematic state over time.

FIG. 16B is a flowchart expanding on the correcting of 1625, according to an embodiment.

1645 includes determining an error in the estimated kinematic state from 1610, based on the photogrammetrically determined position. This is repeated over time as indicated at 1630, to produce a stream of errors.

1650 includes filtering the determined errors over time, to produce a correction.

1655 includes adjusting the kinematic state estimate based on the correction.

FIG. 16C is a flowchart of an example method 1670 of determining the real-world positions of lights, referenced in 1620 of method 1600, according to the tightly coupled embodiment.

1675 includes transforming the estimated kinematic state (e.g., each of the estimated position, velocity, and orientation from 1610) from a navigation coordinate frame to an image plane coordinate frame of the light receiver/imager in the device.

1680 includes predicting where each beam position will move across the light imager based on the transformed estimated kinematic state.

1685 includes demodulating a light ID from each recorded light beam from the corresponding image position in the light imager, taking into account the predicted movement of the beam.

1690 includes accessing the predetermined real-world position of each originating light based on the demodulated ID.

The loosely coupled embodiment also determines the real-world position of a light based on its demodulated IDs, however, the loosely coupled embodiment omits 1675 and 1680 of method 1670. Therefore, the loosely coupled embodiment includes demodulating the light ID without the benefit of the predicted movement of the beam.

Computer Processor System

Figure 17:
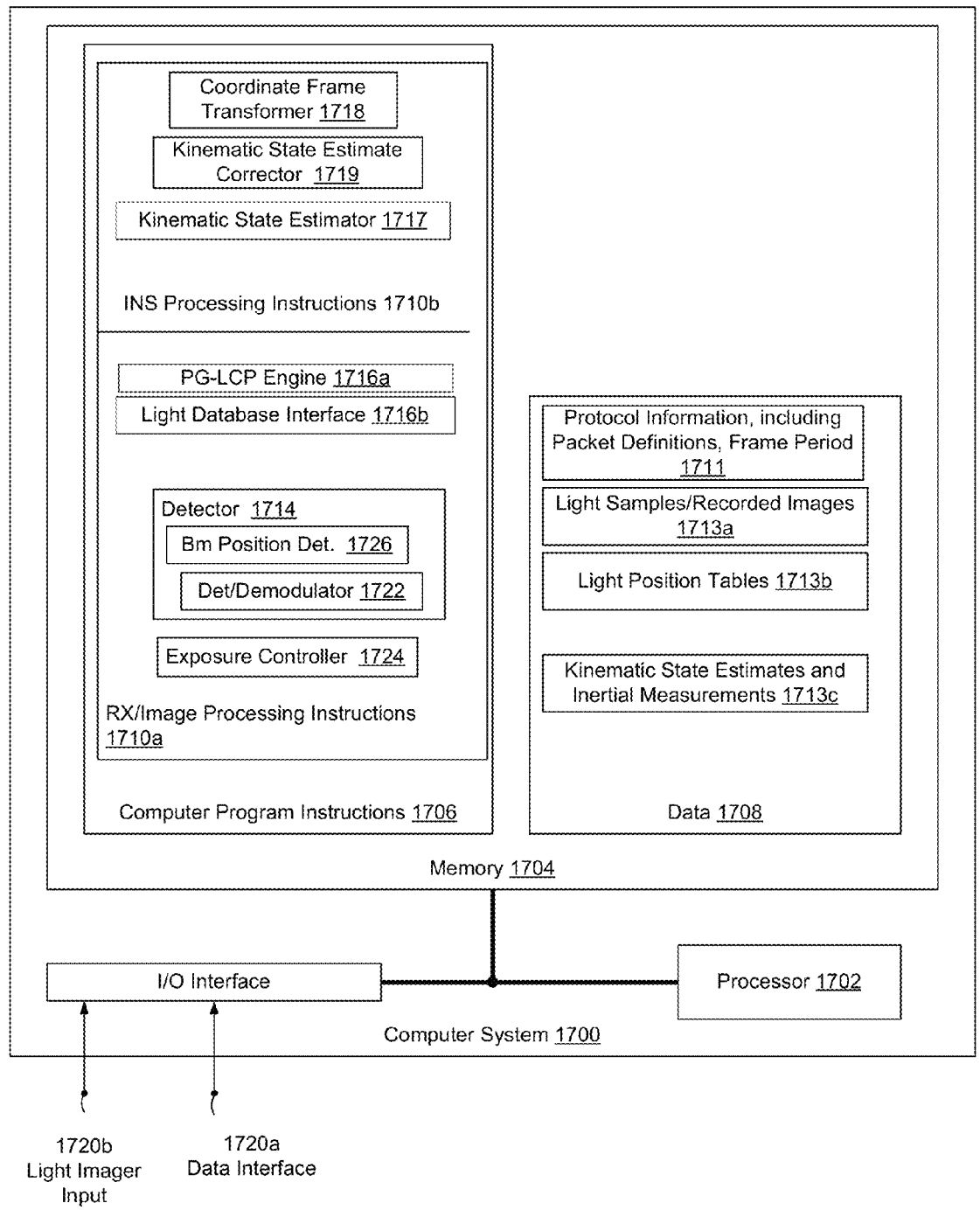
FIG. 17 is a block diagram of an example computer processor system configured for integrated PG-LCP and INS positioning processing.

FIG. 17 is a block diagram of an example computer processor system 1700 configured for integrated PG-LCP and INS processing, including processing modules of PG-LCP, and processing modules of INS positioning, in accordance with examples described herein.

Computer system 1700 may include one or more instruction processing units, illustrated here as a processor 1702, which may include a processor, one or more processor cores, or a micro-controller.

Computer system 1700 may include memory, cache, registers, and/or storage, illustrated here as memory 1704.

Memory 1704 may include one or more non-transitory computer readable mediums encoded with a computer program, including instructions 1706.

Memory 1704 may include data 1708 to be used by processor 1702 in executing instructions 1706, and/or generated by processor 1702 during execution of instructions 1706. Data 1708 may be received from and/or transmitted to external modules over a data interface 1720a. Data 1708 includes: protocol information 1711, including light packet protocol definitions, frame periods, and so on; recorded images 1713a from an imager, such as a camera, which may be received through the I/O interface at input 1720b; light position tables (light IDs and real-world position information) 1713b; and kinematic state information, such as state estimates, and inertial measurements from inertial sensors 1713c.

Instructions 1706 include instructions 1710a for light receiver (RX) processing of recorded images as described in the examples above, including photogrammetric position determination. Instructions 1710a include:

instructions 1714 for implementing a detector, which include instructions 1722 to implement a light beam detector/demodulator such as a FSOOK/UFSOOK detector/demodulator, and instructions 1726 to implement a beam position determiner;

instructions 1724 to implement an image array exposure controller;

instructions 1716a to implement a PG-LCP Engine to derive position estimates, photogrammetrically; and instructions 1716b to implement a light database interface to access light IDs from light position tables.

Instructions 1706 also include instructions 1710b for INS processing of inertial measurements, including:

instructions 1717 to implement a kinematic state estimator that operates based on IMU measurements;

instructions 1718 to implement a coordinate frame transformer to perform coordinate frame transformations between an image plane coordinate frame and a navigation coordinate frame; and instructions 1719 to implement a kinematic state estimate corrector.

The instructions 1710a and 1710b interact, or are integrated, as necessary to implement an integrated PG-LCP and INS positioning system as described in the examples above.

The instructions 1710a and 1710b are also referred to as processing modules to implement the functions described in one or more examples above.

Wireless Communication Receiver System

Figure 18:
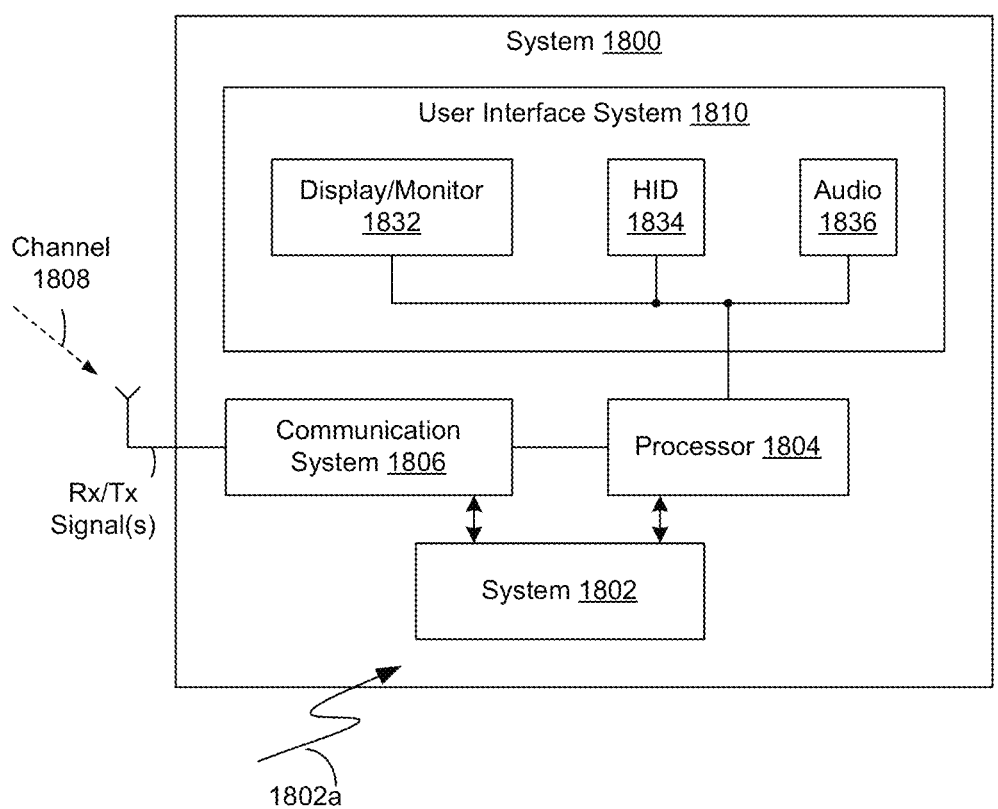
FIG. 18 is a block diagram of an example system including a system configured as an integrated PG-LCP and INS positioning system in accordance with one or more embodiments described herein.

FIG. 18 is a block diagram of an example system 1800 including a system or apparatus 1802 configured as an integrated PG-LCP and INS positioning system as described in one or more examples above. System 1802 may include a light receiver as described in one or more examples above.

System 1800 may include a processor (and memory) 1804.

System 1800 may include a communication system, including a transceiver, 1806 to interface between system 1802, processor 1804, and a communication network over a channel 1808. Communication system 1806 may include a wired and/or wireless communication system. System 1802, such as a light receiver, may retrieve map light information from a remote light map database (not shown in FIG. 18) over communication channel 1808.

System 1800 or portions thereof may be implemented within one or more integrated circuit dies, and may be implemented as a system-on-a-chip (SoC).

System 1800 may include a user interface system 1810 to interface system 1810.

User interface system 1810 may include a monitor or display 1832 to display information from processor 1804.

User interface system 1810 may include a human interface device (HID) 1834 to provide user input to processor 1804. HID 1834 may include, for example and without limitation, one or more of a keyboard, a cursor device, a touch-sensitive device, and or a motion and/or imager. HID 1834 may include a physical device and/or a virtual device, such as a monitor-displayed or virtual keyboard.

User interface system 1810 may include an audio system 1836 to receive and/or output audible sound.

System 1800 may further include a transmitter system to transmit signals from system 1800.

System 1800 may correspond to, for example, a computer system, a personal communication device, and/or a television set-top box.

System 1800 may include a housing, and one or more of communication system 1802, digital processor system 1804, user interface system 1810, or portions thereof may be positioned within the housing. The housing may include, without limitation, a rack-mountable housing, a desk-top housing, a lap-top housing, a notebook housing, a net-book housing, a tablet housing, a set-top box housing, a portable housing, and/or other conventional electronic housing and/or future-developed housing. For example, communication system 1802 may be implemented to receive a digital television broadcast signal, and system 1800 may include a set-top box housing or a portable housing, such as a mobile telephone housing. System 1800 may be implemented in a camera-equipped smartphone, or may be implemented as part of a wireless router.

General Treatment of Photogrammetric Positioning

The principle of photogrammetric positioning is observing multiple visual features, assumed to be lights, such as LEDs in an LED constellation or array, with known positions such that the observer can ascertain their position relative to the LED constellation.

FIG. 19 is an illustration helpful in describing the principle of photogrammetric positioning, including the relevant equations. In FIG. 19, "camera" may be interpreted more generally as "light receiver," and both "image sensor" and "sensor" correspond to "light sensor."

With reference to FIG. 19, first, the following three coordinate systems involved with the positioning are defined.

2-D sensor coordinates
3-D camera coordinates
3-D "world" or "real-world" coordinates.

The basic process is as follows:

map the LED images into sensor coordinates described by vector <u,v> map the sensor coordinate points into camera coordinates described by vector $t_{cw}$ translate the origin of the camera coordinate system to real world coordinates described by vector $t_{wc}$.

The mapping of the light features onto the image sensor plane is based upon the collinearity condition given below.

$$u = -f \frac{s_1\alpha + s_2\beta + x_{cw} + s_3}{s_7\alpha + s_8\beta + z_{cw} + s_9} \qquad \text{Eq. 7}$$

$$v = -f \frac{s_4\alpha + s_5\beta + y_{cw} + s_6}{s_7\alpha + s_8\beta + z_{cw} + s_9} \qquad \text{Eq. 8}$$

We introduce the notation of $$u' \equiv \frac{u}{-f}, v' \equiv \frac{v}{-f}$$

to rewrite equations 7 and 8 as $$u' = \frac{s_1\alpha + s_2\beta + x_{cw} + s_3}{s_7\alpha + s_8\beta + z_{cw} + s_9} \qquad \text{Eq. 9}$$

$$v' = \frac{s_4\alpha + s_5\beta + y_{cw} + s_6}{s_7\alpha + s_8\beta + z_{cw} + s_9}. \qquad \text{Eq. 10}$$

The $s_i$ values are related to the rotational inclination matrix, which is obtained as a decomposition of the general rotational matrix into its azimuth and inclination components $$R_{wc} = R_{wc}{}^a \cdot R_{wc}{}^i. \qquad \text{Eq. 11}$$

Each element of $R_{wc}^i$ is directly determined by reading the inclination sensor which is assumed to be embedded within the image sensor. Because the viewing transformation from the point $x_w$ (world coordinates) to point $x_c$ (camera coordinates) is given by $x_c = (R_{wc}^i)^{-1} \cdot (R_{wc}^a)^{-1} \cdot x_w + t_{cw}$, further equation manipulation will require that we utilize the inverses of the compound rotational matrix.

The components of the inverse azimuth rotational matrix, which need to be determined as part of the positioning calculations, are given by $$(R_{wc}^a)^{-1} = \begin{bmatrix} \cos\theta & 0 & -\sin\theta \\ 0 & 1 & 0 \\ \sin\theta & 0 & \cos\theta \end{bmatrix} = \begin{bmatrix} \alpha & 0 & -\beta \\ 0 & 1 & 0 \\ \beta & 0 & \alpha \end{bmatrix}. \quad \text{Eq. 12}$$

The $s_i$ values are given by the relationship $$\begin{bmatrix} s_1 & s_2 & s_3 \\ s_4 & s_5 & s_6 \\ s_7 & s_8 & s_9 \end{bmatrix} = \begin{bmatrix} r_{11}^i x_w + r_{13}^i z_w & r_{13}^i x_w - r_{11}^i z_w & r_{12}^i y_w \\ r_{21}^i x_w + r_{23}^i z_w & r_{23}^i x_w - r_{21}^i z_w & r_{22}^i y_w \\ r_{31}^i x_w + r_{33}^i z_w & r_{33}^i x_w - r_{31}^i z_w & r_{32}^i y_w \end{bmatrix} \quad \text{Eq. 13}$$

where the $[r_{mn}^i]$ values are determined by the inverse of the inclination matrix as $$(R_{wc}^i)^{-1} = \begin{bmatrix} r_{11}^i & r_{12}^i & r_{13}^i \\ r_{21}^i & r_{22}^i & r_{23}^i \\ r_{31}^i & r_{32}^i & r_{33}^i \end{bmatrix}. \quad \text{Eq. 14}$$

Equations 9 and 10 can be manipulated into a system of linear equations as $$u's_7\alpha + u's_8\beta + u'z_{cw} + u's_9 = s_1\alpha + s_2\beta + x_{cw} + s_3\alpha(u's_7 - s_1) + \beta$$
$$(u's_8 - s_2) - x_{cw} + u'z_{cw} = s_3 - u's_9 \quad \text{Eq. 15}$$

$$v's_7\alpha + v's_8\beta + v'z_{cw} + v's_9 = s_4\alpha + s_5\beta + y_{cw} + s_6\alpha(v's_7 - s_4) + \beta$$
$$(v's_8 - s_5) - y_{cw} + v'z_{cw} = s_6 - v's_9 \quad \text{Eq. 16}$$

Equations 15 and 16 can be put into matrix form as $$\begin{bmatrix} u's_7 - s_1 & u's_8 - s_2 & -1 & 0 & u' \\ v's_7 - s_4 & v's_8 - s_5 & 0 & -1 & v' \end{bmatrix} \begin{bmatrix} \alpha \\ \beta \\ x_{cw} \\ y_{cw} \\ z_{cw} \end{bmatrix} = \begin{bmatrix} s_3 - u's_9 \\ s_6 - v's_9 \end{bmatrix}. \quad \text{Eq. 17}$$

For the $i^{th}$ light feature we define $$A_i = \begin{bmatrix} u's_7 - s_1 & u's_8 - s_2 & -1 & 0 & u' \\ v's_7 - s_4 & v's_8 - s_5 & 0 & -1 & v' \end{bmatrix} \quad \text{Eq. 18}$$

$$p = \begin{bmatrix} \alpha \\ \beta \\ x_{cw} \\ y_{cw} \\ z_{cw} \end{bmatrix} \quad t_{cw} = \begin{bmatrix} x_{cw} \\ y_{cw} \\ z_{cw} \end{bmatrix} \therefore p = \begin{bmatrix} \alpha \\ \beta \\ t_{cw} \end{bmatrix} \quad \text{Eq. 19}$$

$$b_i = \begin{bmatrix} s_3 - u's_9 \\ s_6 - v's_9 \end{bmatrix} \quad \text{Eq. 20}$$

such that $A_i \cdot p = b_i$.

When multiple features are detected, a system of linear simultaneous equations describing p can be obtained that performs a least mean square estimate as $$p = \begin{bmatrix} A_1 \\ A_2 \\ M \\ A_n \end{bmatrix}^+ \begin{bmatrix} b_1 \\ b_2 \\ M \\ b_n \end{bmatrix} \quad \text{Eq. 21}$$

where $i \geq 3$ (i.e. $\geq 3$ features), with at least 3 features being non-collinear, and the superscript $^+$ notation indicates the pseudo-inverse operation.

The camera origin is then translated and rotated such that its location is in terms of world coordinates, which yields the desired solution of $$t_{wc} = -R_{wc} \cdot t_{cw}. \quad \text{Eq. 22}$$

The camera azimuth orientation angle is derived from Eq. 19 as $$\theta = a\tan 2\left(\frac{\beta}{\alpha}\right). \quad \text{Eq. 23}$$

Methods and systems disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, and/or a combination of integrated circuit packages. Software may include a computer readable medium encoded with a computer program including instructions to cause a processor to perform one or more functions in response thereto. The computer readable medium may include one or more non-transitory mediums. The processor may include a general purpose instruction processor, a controller, a microcontroller, and/or other instruction-based processor.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed.

Various computer program, method, apparatus, and system embodiments are described herein.

A. A Computer Program Product (CPP) Embodiment

A CPP embodiment includes a non-transitory computer readable medium encoded with a computer program, including instructions to cause a processor to:

receive measured inertial quantities resulting from movement of a device;

estimate a kinematic state associated with the movement based on the measured inertial quantities;

record, in the device, light beams originating from lights at respective image positions in a sequence of images;

photogrammetrically determine a position of the device relative to the originating lights based on predetermined real-world positions and corresponding ones of the image positions of the lights; and correct the estimated kinematic state based on the photogrammetrically determined position, to produce a corrected estimated kinematic state.

The light beams may each be modulated to convey information from which the predetermined real-world position of the corresponding originating light is determinable The instructions may further include instructions to cause the processor to:

demodulate the information from each recorded light beam; and determine the predetermined real-world position of the originating light based on the corresponding demodulated information for that light.

In the computer readable medium:

the light beams may each be modulated to convey an originating light identifier (ID) used to index the corresponding real-world position of the originating light with that ID;

the instructions to cause the processor to demodulate may include instructions to cause the processor to demodulate the ID from each recorded light beam; and the instruction to cause the processor to determine may include instructions to cause the processor to access the predetermined real-world position of each originating light based on the demodulated ID.

The device may include a light imager to record the light beams at the image positions on the light imager, and the instructions may further include instructions to cause the processor to, while demodulating each recorded light beam from the corresponding image position in the light imager, track movement of the image position for that light beam across the light imager, caused by the movement of the device, based on the estimated kinematic state.

In the computer readable medium, the instructions to cause the processor to track may include instructions to cause the processor to:

transform the estimated kinematic state from a navigation coordinate frame to an image plane coordinate frame of the light imager; and predict where each beam position will move across the light imager based on the transformed estimated kinematic state.

In the computer readable medium, the instructions to cause the processor to correct may include instructions to cause the processor to:

determine an error in the estimated kinematic state based on the photogrammetrically determined position;

filter the determined error over time, to produce a correction; and adjust the kinematic state estimate based on the correction.

In the computer readable medium:

the measured inertial quantities may include a measured acceleration and a measured orientation of the device; and the instructions to cause the processor to estimate may include instructions to cause the processor to estimate a kinematic state to include an estimated position and an estimated velocity of the device, based on the measured acceleration and the measured orientation.

In the computer readable medium:

the instructions to cause the processor to estimate may further include instructions to cause the processor to estimate an orientation of the device; and the instructions to cause the processor to photogrammetrically determine may include instructions to cause the processor to photogrammetrically determine the position based on the estimated orientation.

B. Apparatus Embodiment

An apparatus embodiment comprises:

one or more processing modules configured to:

estimate a kinematic state associated with movement of the apparatus based on measured inertial quantities associated with the movement;

access a recording, made in the apparatus, of light beams originating from lights at respective image positions in a sequence of images;

photogrammetrically determine a position of the apparatus relative to the originating lights based on predetermined real-world positions and corresponding ones of the image positions of the lights; and correct the estimated kinematic state based on the photogrammetrically determined position, to produce a corrected estimated kinematic state.

The light beams may each be modulated to convey information from which the predetermined real-world position of the corresponding originating light is determinable, and the one or more processing modules may be further configured to:

demodulate the information from each recorded light beam; and determine the predetermined real-world position of the originating light based on the corresponding demodulated information for that light.

The light beams may each be modulated to convey an originating light identifier (ID) used to index the corresponding real-world position of the originating light associated with that ID, and the one or more processing modules may be further configured to:

demodulate the ID from each recorded light beam; and access the predetermined real-world position of each originating light based on the demodulated ID.

The apparatus may further comprise a light imager to record the light beams at the image positions on the light imager, and the one or more processing modules may be further configured to, while each recorded light beam is being demodulated from the corresponding image position in the light imager, track movement of the image position for that light beam across the light imager, caused by the movement of the device, based on the estimated kinematic state.

In the apparatus, the one or more processing modules configured to track movement of the image position may be configured to:

transform the estimated kinematic state from a navigation coordinate frame to an image plane coordinate frame of the light imager; and predict where each beam position will move across the light imager based on the transformed estimated kinematic state.

In the apparatus, the one or more processing modules configured to correct may be configured to:

determine an error in the estimated kinematic state based on the photogrammetrically determined position;

filter the determined error over time, to produce a correction; and adjust the kinematic state estimate based on the correction.

In the apparatus:

the measured quantities may include a measured acceleration and a measured orientation of the apparatus; and the one or more processing modules may be further configured to estimate the kinematic state to include an estimated position and an estimated velocity of the apparatus.

In the apparatus:

the one or more processing modules may be further configured to estimate the kinematic state to further include an estimated orientation of the device; and the one or more processing modules may be further configured to photogrammetrically determine the position based on the estimated orientation.

The apparatus may further comprise:

an inertial measurement unit (IMU) to measure the inertial quantities;

a light receiver to record the light beams;

a communication system to communicate with a network;

a processor and memory to interface between the communication system and a user interface system; and a housing, wherein the IMU, the light receiver, the processor and memory, and the communication system, are positioned within the housing.

In the apparatus:

the communication system may include a wireless communication system; and the housing may include a mobile hand-held housing to house the communication system, the processor, the user interface system, and a battery.

C. Method Embodiment

A method embodiment comprise:

measuring inertial quantities resulting from movement of a device;

estimating a kinematic state associated with the movement based on the measured inertial quantities;

recording, in the device, light beams originating from lights at respective image positions in a sequence of images;

photogrammetrically determining a position of the device relative to the originating lights based on predetermined real-world positions and corresponding ones of the image positions of the lights; and correcting the estimated kinematic state based on the photogrammetrically determined position, to produce a corrected estimated kinematic state.

The light beams may each be modulated to convey information from which the predetermined real-world position of the corresponding originating light is determinable, and the method may further comprise:

demodulating the information from each recorded light beam; and determining the predetermined real-world position of the originating light based on the corresponding demodulated information for that light.

In the method:

the light beams may each be modulated to convey an originating light identifier (ID) used to index the corresponding real-world position of the originating light with that ID;

the demodulating may include demodulating the ID from each recorded light beam; and the determining may include accessing the predetermined real-world position of each originating light based on the demodulated ID.

The device may include a light imager to record the light beams at the image positions on the light imager, and the method may further comprise, while demodulating each recorded light beam from the corresponding image position in the light imager, tracking movement of the image position for that light beam across the light imager, caused by the movement of the device, based on the estimated kinematic state.

The tracking may include:

transforming the estimated kinematic state from a navigation coordinate frame to an image plane coordinate frame of the light imager; and predicting where each beam position will move across the light imager based on the transformed estimated kinematic state.

The correcting may include:

determining an error in the estimated kinematic state based on the photogrammetrically determined position;

filtering the determined error over time, to produce a correction; and adjusting the kinematic state estimate based on the correction.

In the method:

the measuring may include measuring an acceleration and an orientation of the device; and the estimating may include estimating a kinematic state to include an estimated position and an estimated velocity of the device, based on the measured acceleration and the measured orientation.

In the method:

the estimating may further includes estimating an orientation of the device; and the photogrammetrically determining may use the estimated orientation.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the examples disclosed herein.

What is claimed is:

1. A non-transitory computer readable medium encoded with a computer program that includes instructions to cause a processor to:

receive measured inertial quantities resulting from movement of an apparatus;

estimate a kinematic state associated with the movement based on the measured inertial quantities;

record a sequence of images of an array of spatially positioned lights, wherein each image includes images of modulated light beams emitted from respective lights of the array at respective 2-dimensional coordinates of the image;

demodulate identifiers from the images of modulated light beams;

retrieve predetermined physical positions of the lights of the array, within a 3-dimensional coordinate frame, based on the respective demodulated identifiers:

photogrammetrically determine a position of the apparatus relative to the array of lights based on the predetermined physical positions of the respective lights within the 3-dimensional coordinate frame, the 2-dimensional coordinates of the images of the light beams within the images, and the estimated kinematic state; and correct the estimated kinematic state based on the photogrammetrically determined position to produce a corrected estimated kinematic state.

2. The non-transitory computer readable medium of claim 1, further including instructions to cause the processor to:

determine the 2-dimensinal coordinates of the images of the light beams relative to a 2-dimensional image plane coordinate frame of an imaging device;

transform the 2-dimensinal coordinates of the images of the light beams from the 2-dimesional image plane coordinate frame to the 3-dimensional coordinate frame based on the estimated kinematic state; and
compute the position of the apparatus within the 3-dimensional coordinate frame based on the transformed coordinates of the images of the light beams and the predetermined physical positions of the lights within the 3-dimensional coordinate frame.

3. The non-transitory computer readable medium of claim 1, further including instructions to cause the processor to:
estimate positions and corresponding orientations of the apparatus based on the measured inertial quantities;
transform the estimated positions to the 3-dimensional coordinate frame based on the corresponding estimated orientations;
photogrammetrically determine a position of the apparatus for each of multiple sequences of images;
compute a difference between each photogrammetrically determined position and a corresponding transformed estimated position;
filter the differences over time to reduce noise generated by sensors of the inertial quantities;
adjust the transformed estimated positions based on the filtered differences; and
output the adjusted transformed estimated positions as error-corrected positions of the apparatus within the 3-dimesnaion coordinate frame.

4. The non-transitory computer readable medium of claim 2, further including instructions to cause the processor to:
estimate orientations of the apparatus based on the measured inertial quantities;
transform the estimated orientations from a kinetic sensor coordinate frame to the 2-dimensional image plane coordinate frame;
predict the 2-dimensional coordinates of the images of the light beams over the sequence of images based on the transformed estimated orientations;
demodulate the identifiers from the images of the light beams based on the predicted 2-dimensional coordinates of the images of the light beams; and
retrieve the predetermined physical positions of the lights within the 3-dimensional coordinate frame based on the identifiers.

5. The non-transitory computer readable medium of claim 3, further including instructions to cause the processor to:
estimate the positions and corresponding orientations of the apparatus at a first rate; and
photogrammetrically determine the positions of the apparatus for the respective images at a second rate that is lower than the first rate.

6. The non-transitory computer readable medium of claim 3, further including instructions to cause the processor to:
estimate the positions and corresponding orientations of the apparatus based on outputs of an accelerometer, a gyroscope, and a magnetometer; and
estimate a travel distance of the apparatus based on the estimated orientation, the output of the accelerometer, and gravity compensation.

7. The non-transitory computer readable medium of claim 3, further including instructions to cause the processor to:
estimate a length of a walking step of a user of the apparatus;
detect walking steps of the user based on the measured inertial quantities; and
compute a travel distance of the user based on output of an accelerometer, the estimated length of a walking step, and detected walking steps of the user.

8. An apparatus, comprising, a controller configured to:
estimate a kinematic state associated with movement of the apparatus based on measured inertial quantities associated with the movement;
access a sequence of images of an array of spatially positioned lights, recorded from a perspective of the apparatus, wherein each image includes images of light beams emitted from respective lights of the array at respective 2-dimensional coordinates of the image;
demodulate identifiers from the images of modulated light beams;
retrieve predetermined physical positions of the lights of the array, within a 3-dimensional coordinate frame, based on the respective demodulated identifiers;
photogrammetrically determine a position of the apparatus relative to the array of lights based on the predetermined physical positions of the lights within the 3-dimensional coordinate frame, the 2-dimensional coordinates of the images of the light beams within the images, and the estimated kinematic state; and
correct the estimated kinematic state based on the photogrammetrically determined position to provide a corrected estimated kinematic state.

9. The apparatus of claim 8, wherein the controller is further configured to:
determine the 2-dimensional coordinates of the images of the light beams relative to a 2-dimensional image plane coordinate frame of an imaging device;
transform the 2-dimensional coordinates of the images of the light beams from the 2-dimesional image plane coordinate frame to the 3-dimensional coordinate frame based on the estimated kinematic state; and
compute the position of the apparatus within the 3-dimensional coordinate frame based on the transformed coordinates of the images of the light beams and the predetermined physical positions of the lights within the 3-dimensional coordinate frame.

10. The apparatus of claim 8, wherein the controller is further configured to:
estimate positions and corresponding orientations of the apparatus based on the measured inertial quantities;
transform the estimated positions to the 3-dimensional coordinate frame based on the corresponding estimated orientations;
photogrammetrically determine a position of the apparatus for each of multiple sequences of images;
compute a difference between each photogrammetrically determined position and a corresponding transformed estimated position;
filter the differences over time to reduce noise generated by sensors of the inertial quantities;
adjust the transformed positions based on the filtered differences; and
output the adjusted transformed estimated positions as error-corrected positions of the apparatus within the 3-dimesnaion coordinate frame.

11. The apparatus of claim 9, wherein the controller is further configured to:
estimate orientations of the apparatus based on the measured inertial quantities;
transform the estimated orientations from a kinetic sensor coordinate frame to the 2-dimesional image plane coordinate frame;

predict the 2-dimensional coordinates of the images of the light beams over the sequence of images based on the transformed estimated orientations;

demodulate the identifiers from the images of the light beams based on the predicted 2-dimensional coordinates of the images of the light beams; and retrieve the predetermined physical positions of the lights within the 3-dimensional coordinate frame based on the identifiers.

12. The apparatus of claim 10, wherein the controller is further configured to:

estimate the positions and corresponding orientations of the apparatus at a first rate; and photogrammetrically determine the positions of the apparatus for the respective images at a second rate that is lower than the first rate.

13. The apparatus of claim 10, wherein the controller is further configured to:

estimate the positions and corresponding orientations of the apparatus based on outputs of an accelerometer, a gyroscope, and a magnetometer; and estimate travel distance of the apparatus based on the estimated orientation, the output of the accelerometer, and gravity compensation.

14. The apparatus of claim 10, wherein the controller is further configured to:

estimate a length of a walking step of a user of the apparatus;

detect walking steps of the user based on the measured inertial quantities; and compute a travel distance of the apparatus based on output of an accelerometer, the estimated length of a walking step, and detected walking steps of the user.

15. A method, comprising:

measuring inertial quantities resulting from movement of an apparatus;

estimating a kinematic state associated with the movement based on the measured inertial quantities;

recording a sequence of images of an array of spatially positioned lights, from a perspective of the apparatus, wherein each image includes images of light beams emitted from respective lights of the array at respective 2-dimensional coordinates of the image;

demodulating identifiers from the images of modulated light beams;

retrieving predetermined physical positions of the lights of the array, within a 3-dimensional coordinate frame, based on the respective demodulated identifiers;

photogrammetrically determining a position of the apparatus relative to the array of lights based on the predetermined physical positions of the respective lights within the 3-dimensional coordinate frame, the 2-dimensional coordinates of the images of the light beams within the images, and the estimated kinematic state; and correcting the estimated kinematic state based on the photogrammetrically determined position to provide a corrected estimated kinematic state.

16. The method of claim 15, wherein the photogrammetrically determining includes:

determining the 2-dimensinal coordinates of the images of the light beams relative to a 2-dimesional image plane coordinate frame of an imaging device;

transforming the 2-dimesinal coordinates of the images of the light beams from the 2-dimesional image plane coordinate frame to the 3-dimensional coordinate frame based on the estimated kinematic state; and computing the position of the apparatus within the 3-dimensional coordinate frame based on the transformed coordinates of the images of the light beams and the predetermined physical positions of the lights within the 3-dimensional coordinate frame.

17. The method of claim 15, wherein:

the estimating a kinematic state includes estimating positions and corresponding orientations of the apparatus based on the measured inertial quantities, and transforming the estimated positions to the 3-dimensional coordinate frame based on the corresponding estimated orientations;

the photogrammetrically determining includes photogrammetrically determining a position of the apparatus for each of multiple sequences of images; and the correcting includes computing a difference between each photogrammetrically determined position and a corresponding transformed estimated position, filtering the transformed differences over time to reduce noise generated by sensors of the inertial quantities, adjusting the transformed estimated positions based on the filtered differences, and outputting the adjusted transformed estimated positions as error-corrected positions of the apparatus within the 3-dimensional coordinate frame.

18. The method of claim 16, wherein the estimating a kinematic state includes estimating orientations of the apparatus based on the measured inertial quantities, and wherein the photogrammetrically determining further includes:

transforming the estimated orientations from a kinetic sensor coordinate frame to the 2-dimensional image plane coordinate frame;

predicting the 2-dimensional coordinates of the images of the light beams over the sequence of images based on the transformed estimated orientations;

demodulating the identifiers from the images of the light beams based on the predicted 2-dimensional coordinates of the images of light; and retrieving the predetermined physical positions of the lights within the 3-dimensional coordinate frame based on the identifiers.

19. The method of claim 17, further including:

performing the estimating positions and corresponding orientations of the apparatus at a first rate; and performing the photogrammetrically determining a position of the apparatus for each of multiple sequences of images at a second rate that is lower than the first rate.

20. The method of claim 17, further including:

performing the estimating positions and corresponding orientations of the apparatus based on outputs of an accelerometer, a gyroscope, and a magnetometer; and estimating a travel distance of the apparatus based on the estimated orientation, the output of the accelerometer, and gravity compensation.

21. The method of claim 17, further including:

estimating a length of a walking step of a user of the apparatus;

detecting walking steps of the user based on the measured inertial quantities; and computing a travel distance of the apparatus based on output of an accelerometer, the estimated length of a walking step, and detected walking steps of the user.

* * * * *